United States Patent
Kim

(10) Patent No.: US 10,216,686 B2
(45) Date of Patent: Feb. 26, 2019

(54) METHOD AND APPARATUS FOR FULL DUPLEX TRANSMISSION BETWEEN ELECTRONIC DEVICES

(71) Applicant: Samsung Electronics Co., Ltd., Gyeonggi-do (KR)

(72) Inventor: Shinho Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 431 days.

(21) Appl. No.: 15/007,977

(22) Filed: Jan. 27, 2016

(65) Prior Publication Data

US 2016/0217103 A1 Jul. 28, 2016

(30) Foreign Application Priority Data

Jan. 27, 2015 (KR) .................... 10-2015-0012779

(51) Int. Cl.
  *G06F 13/42* (2006.01)
  *H04L 5/14* (2006.01)
  *G06F 13/362* (2006.01)

(52) U.S. Cl.
  CPC ........ *G06F 13/4282* (2013.01); *G06F 13/362* (2013.01); *H04L 5/14* (2013.01)

(58) Field of Classification Search
  CPC ....... G06F 13/362; G06F 13/4282; H04L 5/14
  See application file for complete search history.

(56) References Cited

U.S. PATENT DOCUMENTS 9,379,497 B2 * 6/2016 Liu ............... H01R 13/665
9,904,338 B2 * 2/2018 Wu ..................... G06F 1/26
2012/0102244 A1 * 4/2012 Shiraishi ............ G06F 13/385
                                                                710/63

(Continued)

FOREIGN PATENT DOCUMENTS

KR  1020130078660  7/2013

OTHER PUBLICATIONS

Universal Serial Bus Type-C Cable and Connector Specification, Release 1.1, Apr. 3, 2015, Copyright 2015 USB 3.0 Promotor Group, pp. 180.

*Primary Examiner* — Henry Tsai
*Assistant Examiner* — Christopher A Daley
(74) *Attorney, Agent, or Firm* — The Farrell Law Firm, P.C.

(57) ABSTRACT

An electronic device and method of communication using a USB interface through full duplex transmission are disclosed. A method of performing data communication by an electronic device includes detecting a connection of an electronic device through an interface, configuring the electronic device as a host or a slave for data communication of first data in response to the connection of the electronic device, performing first data communication based on a first communication path according to a first standard for the first data in response to detecting the configuration, detecting performance of data communication of second data while the data communication of the first data is performed, configuring the electronic device as the host or the slave for the data communication of the second data and performing second data communication based on a second communication path according to a second standard for the second data in response to the configuration.

17 Claims, 14 Drawing Sheets

(56) References Cited

U.S. PATENT DOCUMENTS

| | | | |
|---|---|---|---|
| 2012/0290761 A1* | 11/2012 | Chen | G06F 13/4045 |
| | | | 710/305 |
| 2013/0336334 A1* | 12/2013 | Gilbert | H04J 3/16 |
| | | | 370/458 |
| 2016/0110305 A1* | 4/2016 | Hundal | G06F 13/4022 |
| | | | 710/316 |
| 2016/0217093 A1* | 7/2016 | Whittington | H04L 12/462 |

* cited by examiner

METHOD AND APPARATUS FOR FULL DUPLEX TRANSMISSION BETWEEN ELECTRONIC DEVICES

PRIORITY

This application claims priority under 35 U.S.C. § 119(a) to Korean Patent Application Serial No. 10-2015-0012779, which was filed in the Korean Intellectual Property Office on Jan. 27, 2015, the entire content of which is incorporated herein by reference.

BACKGROUND

1. Field of the Disclosure

The present disclosure generally relates to a communication method through which electronic devices using a Universal Serial Bus (USB) can exchange data based on simultaneous full duplex transmission, and an electronic device supporting the same.

2. Description of the Related Art

With the recent development of digital technologies, various types of electronic devices such as a mobile communication terminal, a smart phone, a tablet Personal Computer (PC), a Personal Digital Assistant (PDA), an electronic note, a notebook, a wearable device, and a Television (TV) are widely used. Such an electronic device provides various interfaces for data transmission, and supports data communication (for example, data transmission or reception) between electronic devices through a wired scheme or a wireless scheme in accordance with a configured interface between the electronic devices.

For example, the electronic device may provide an interface through which data can be exchanged in a wireless scheme based on short-range communication such as Bluetooth, Wi-Fi, or Near Field Communication (NFC) and an interface through which data can be exchanged in a wired scheme based on a cable such as a Universal Serial Bus (USB).

The wireless interface scheme has an advantage of not requiring a physical cable connection, but is not universal compared to the wired scheme since the wireless scheme has a limitation on data transmission rate and there are electronic devices which do not support wireless communication. Accordingly, the electronic device may use a scheme to make a physical connection with another electronic device and transmit data based on the wired interface scheme (for example, USB interface).

As described above, a wired type interface may physically connect two electronic devices through a Universal Serial Bus (USB) cable and support data transmission/reception between the electronic devices based on the physical connection. However, a conventional data transmission scheme determines a subject (for example, host) of data transmission and a subject (for example, slave) of data reception and supports only one-way data transmission from one electronic device (for example, host) to the other electronic device (for example, slave) according to the determined subjects. For example, when the electronic device operating as the host transmits data, the electronic device operating as the slave can only receive data. When reverse data transmission is required, the data transmission should be performed after the physical connection state between the electronic devices is released (disconnected), a re-connection between the electronic devices is made, and roles of the host and slave are changed. Further, the electronic device operating as the host does not support additional transmission of another piece of data other than the data used for the current data transmission. Accordingly, when additional data transmission is required during the data communication, the user has to wait until the performed data communication is completed and repeatedly control to perform data transmission through a re-connection between the electronic devices.

SUMMARY

The present disclosure has been made to address at least the above mentioned disadvantages and problems and to provide at least the advantages described below.

Accordingly, an aspect of the present disclosure provides an electronic device and an operation method thereof which performs data communication through full duplex transmission by a wired interface.

Another aspect of the present disclosure provides an electronic device and an operation method thereof in which, while data transmission in one direction is performed between electronic devices when they are connected through the USB interface, data reception in another direction can be performed.

Another aspect of the present disclosure provides an electronic device and an operation method thereof, which support full duplex transmission between electronic devices by using the USB interface based on a USB type-C which can freely change the roles of the host and the slave between the electronic devices.

Another aspect of the present disclosure provides an electronic device and an operation method thereof, which may perform second data communication according to a second standard simultaneously while first data communication based on a first standard is performed between electronic devices.

Another aspect of the present disclosure provides an electronic device and an operation method thereof which improves the user convenience and usability of the electronic device by implementing an optimal environment for data transmission between electronic devices.

In accordance with an aspect of the present disclosure, an electronic device is provided. The electronic device includes an interface for supporting a connection with another electronic device, communication paths according to different standards, and data communication based at least some of the communication paths and a controller for processing data communication for first data based on a first communication path according to a first standard between electronic devices connected through the interface and processing data communication for second data based on a second communication path according to a second standard while the data communication of the first data is performed.

In accordance with an aspect of the present disclosure, an operation method of an electronic device is provided. The operation method includes detecting a connection of an electronic device through an interface, configuring the electronic device as a host or a slave for data communication of first data in response to the connection of the electronic device, performing data communication based on a first communication path according to a first standard for the first data in response to the configuration, detecting performance of data communication of second data while the data communication of the first data is performed, configuring the electronic device as the host or the slave for the data communication of the second data and performing data communication based on a second communication path according to a second standard for the second data in response to the configuration.

In accordance with an aspect of the present disclosure, a computer-readable recording medium having a program recorded therein to execute a process is provided. The process includes processing data communication for first data based on a first communication path according to a first standard between electronic devices connected through an interface and processing data communication for second data based on a second communication path according to a second standard while the data communication for the first data is performed.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
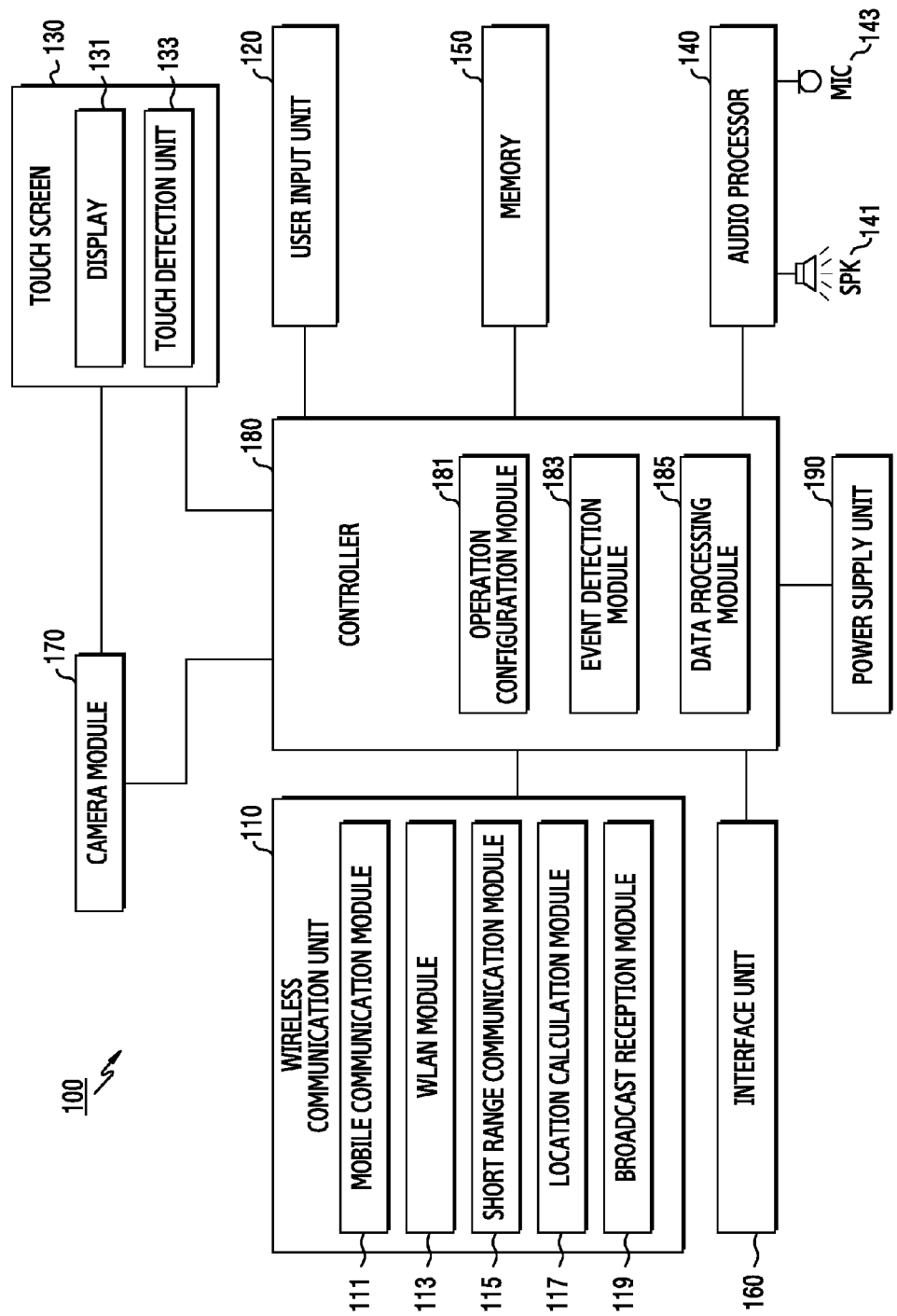
FIG. 1 is a schematic block diagram of an electronic device according to an embodiment of the present disclosure.

Hereinafter, various embodiments of the present disclosure will be described with reference to the accompanying drawings. However, it should be understood that there is no intent to limit various embodiments of the present disclosure to particular forms, and the present disclosure should be construed to cover all modifications, equivalents, and/or alternatives falling within the spirit and scope of various embodiments of the present disclosure. In describing the drawings, similar reference numerals may be used to designate similar constituent elements.

The present disclosure generally relates to an electronic device including a Universal Serial Bus (USB) interface and an operation method thereof. According to an embodiment of the present disclosure, an electronic device which may simultaneously perform full duplex transmission by using a USB interface (for example, a USB type C standard as defined by the USB Implementers Forum, Inc.) and a data communication method thereof will be described.

According to an embodiment of the present disclosure, when electronic devices are connected through a USB interface (for example, a USB type C) supporting at least two data communication paths, different pieces of data may be simultaneously transmitted bilaterally through the USB interface. In an embodiment of the present disclosure, at least two data communication paths may include, for example, a first communication path (for example, a transmission rate X (for example, USB 3.0) based data communication path) according to a first standard (for example, USB 3.0) and a second communication path (for example, a transmission rate Y (for example, USB 2.0) based data path) according to a second standard (for example, USB 2.0). According to an embodiment of the present disclosure, it is assumed that the transmission rate X is faster than the transmission rate Y and data communication is preferentially performed through a communication path having a higher transmission rate when electronic devices perform data communication.

According to an embodiment of the present disclosure, in data communication between electronic devices based on the USB interface, electronic devices which may perform first data communication through the first communication path according to the first standard and second data communication according to the second standard at the same time and an operation method thereof are provided. According to an embodiment of the present disclosure, in data communication between electronic devices based on the USB interface, forward data transmission by the first communication path according to the first standard and reverse data transmission by the second communication path according to the second standard may be simultaneously supported, and thus overall data transmission time may be reduced and user convenience may be provided.

In general, the USB interface may support a change in roles of a host and a slave between the electronic devices. However, once the electronic devices are connected through the USB interface and the roles thereof (for example, host and slave) are configured, only one-way transmission of data is possible until the connection between the electronic devices is disconnected and then the roles of the host and the slave are changed through a re-connection. For example, while the first electronic device (for example, the electronic device operating as the host) transmits a plurality of large capacity files to the second electronic device (the slave) through the first communication path, the second electronic device may transmit different files stored in the second electronic device to the first electronic device sometimes. In this case, when the second electronic device intends to transmit data to the first electronic device while the first electronic device transmits data to the second electronic device, the second electronic device can transmit the data to the first electronic device after the electronic devices wait until the current data transmission (for example, the data transmission from the first electronic device to the second electronic device through the first communication path) ends, a re-connection between the electronic devices is made through the USB interface, and then the roles of the host and the slave are re-configured between the first electronic device and the second electronic device. Accordingly, full duplex transmission between electronic devices could not be supported and as a result, the user may feel inconvenienced by the delay in data transmission.

Accordingly, an embodiment of the present disclosure may redefine a function of the second communication path (USB 2.0 port) according to the second standard between electronic devices through a Biphase Mark Coding (BMC) protocol of Configuration Channel (CC) logic of the USB interface to make forward data transmission through the first communication path (for example, USB 3.0 port) and reverse data transmission through the second communication path (for example, USB 2.0 port) possible at the same time. According to an embodiment of the present disclosure, it is possible to reduce time spent on data transmission by the user and reduce complexity of re-configuration of the roles between the electronic devices whenever data is transmitted.

According to an embodiment of the present disclosure, when electronic devices are connected through a USB interface as defined by the present disclosure, it is possible to simultaneously support data transmission in one direction through a data communication path of the USB interface (for example, first communication path according to the first standard) having a priority and another data transmission in another direction through another data communication path (for example, second communication path according to the second standard).

According to an embodiment of the present disclosure, the electronic device may include a communication device, a multimedia device, and a wearable device that support a function (for example, data communication function based on the USB interface) according to various embodiments of the present disclosure and include various processors such an Application Processor (AP), a Graphic Processing Unit (GPU), and a Central Processing Unit (CPU).

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to an embodiment of the present disclosure, the electronic device may include a smart home appliance. The home appliance may include at least one of a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller machine (ATM) in banks, point of sales (POS) terminal in a shop or Internet of things device (e.g., a light bulb, various sensors, electric or gas meter, a sprinkler device, a fire alarm, a thermostat, a streetlamp, a toaster, a sporting goods, a hot water tank, a heater, a boiler, etc.).

According to an embodiment of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to an embodiment of the present disclosure may be a combination of one or more of the aforementioned devices. The electronic device according to an embodiment of the present disclosure may be a flexible device. Further, the electronic device according to an embodiment of the present disclosure is not limited to the aforementioned devices and may include a new electronic device according to the development of new technology.

FIG. 1 is a schematic block diagram of an electronic device according to an embodiment of the present disclosure.

Referring to FIG. 1, an electronic device 100 according to an embodiment of the present disclosure includes a wireless communication unit 110, a user input unit 120, a touch screen 130, an audio processor 140, a memory 150, an interface unit 160, a camera module 170, a controller 180, and a power supply unit 190. In an embodiment of the present disclosure, the components of the electronic device 100 illustrated in FIG. 1 are not necessary, so that the electronic device 100 may have more components or fewer components in comparison with the components illustrated FIG. 1.

The wireless communication unit 110 includes one or more modules which enable wireless communication between the electronic device 100 and a wireless communication system or between the electronic device 100 and another electronic device (for example, another electronic device or a server). For example, the wireless communication unit 110 may include a mobile communication module 111, a Wireless Local Area Network (WLAN) module 113, a short range communication module 115, a location calculation module 117, and a broadcast reception module 119.

The mobile communication module 111 may transmit/receive a wireless signal to/from at least one of a base station, an external electronic device and various servers (for example, an integration server, a service provider server, a content server, an Internet server, and a cloud server) on a mobile communication network. The wireless signal may include a voice call signal, video call signal, and data in various forms according to the transmission and reception of text/multimedia messages.

The mobile communication module 111 may receive one or more pieces of data (for example, content, messages, mail, images, dynamic images, weather information, location information, time information and the like). According to an embodiment of the present disclosure, the mobile communication module 111 may be connected to at least one external device (for example, another electronic device or a server) which is connected to the electronic device 100 through a network (for example, mobile communication network), so as to acquire (receive) various types of data. The mobile communication module 111 may transmit various pieces of data required for the operation of the electronic device 100 to an external device in response to a user request.

The mobile communication module 111 may perform a communication function. For example, the mobile communication module 111 may convert a Radio Frequency (RF)

signal into a baseband signal and provide the baseband signal to the controller 180 or convert the baseband signal from the controller 180 into the RF signal and transmit the RF signal. The controller 180 may process the baseband signal based on various communication schemes. For example, the communication schemes may include a Global system for Mobile communication (GSM) scheme, an Enhanced Data GSM Environment (EDGE) communication scheme, a Code Division Multiple Access (CDMA) communication scheme, a W-CDMA communication scheme, a Long Term Evolution (LTE) communication scheme or an Orthogonal Frequency Division Multiple Access (OFDMA) communication scheme but are not limited thereto.

The WLAN module 113 may be a module for establishing wireless Internet access and a WLAN link with other external devices. The WLAN module 113 may be installed inside or outside the electronic device 100. The WLAN module 113 may establish wireless Internet technologies including wireless LAN (Wi-Fi), Wireless Broadband (WiBro), World Interoperability for Microwave Access (WiMax), High Speed Downlink Packet Access (HSDPA), millimeter Wave (mmWave), and the like.

The WLAN module 113 may transmit one or more pieces of data selected by the user to the outside or receive the data from the outside. According to an embodiment of the present disclosure, the WLAN module 113 may acquire or receive data from at least one of another electronic device and a server which are connected to the electronic device 100 through a network such as a wireless Internet network. The WLAN module 113 may transmit various types of data to the outside (for example, to the server) or receive the data from the outside in response to a user request. The WLAN module 113 may transmit or receive various types of data corresponding to a user's selection to or from another electronic device when a WLAN link with another electronic device is formed. The WLAN module 113 may always remain in a turned-on state or may be turned on according to a setting of the electronic device 100 or a user input.

The short range communication module 115 may be a module for performing short-range communication. Bluetooth, Bluetooth Low Energy (BLE), Radio Frequency Identification (RFID), Infrared Data Association (IrDA), Ultra Wideband (UWB), ZigBee, Near Field Communication (NFC), and the like may be used as a short range communication technology.

The short range communication module 115 may receive one or more pieces of data. According to an embodiment, the short range communication module 115 may acquire data from another electronic device connected to the electronic device 100 through a network such as a short range communication network. The short range communication module 115 may transmit or receive data corresponding to a user's selection to or from another electronic device when short range communication with another electronic device is connected. The short range communication module 115 may always remain in a turned-on state or may be turned on according to a setting of the electronic device 100 or a user input.

The location calculation module 117 is a module for acquiring a location of the electronic device 100, and may include a Global Position System (GPS). The location calculation module 117 may measure the location of the electronic device 100 through a triangulation principle. For example, the location calculation module 117 may calculate three dimensional information on a current location according to a latitude, a longitude, and an altitude, by calculating information on the distance from three or more base stations and time information, and then applying trigonometry to the calculated information. Alternatively, the location calculation module 117 may calculate location information by continuously receiving location information on the electronic device 100 from three or more satellites in real time. The location information on the electronic device 100 may be obtained by various methods.

The broadcast reception module 119 may receive a broadcast signal (for example, a TV broadcast signal, a radio broadcast signal, a data broadcast signal, and the like) and/or broadcast related information (for example, information associated with a broadcast channel, a broadcast program, or a broadcast service provider) from an external broadcast management server through a broadcast channel (for example, a satellite broadcast channel, a terrestrial broadcast channel, and the like).

The user input unit 120 may generate input data for controlling the operation of the electronic device 100 in response to a user input. The user input unit 120 may include at least one input means for detecting various user inputs. For example, the user input unit 120 may include a keypad, a dome switch, a physical button, a touch pad (resistive type/capacitive type), a jog & shuttle, and a sensor.

According to an embodiment of the present disclosure, the sensor may measure, for example, a physical quantity or detect an operation state of the electronic device 100 and may convert the measured or detected information to an electrical signal. The sensor may include, for example, an iris scan sensor, a finger scan sensor, an image sensor, or an illuminance sensor. Further, the sensor may include at least one of a gesture sensor, a gyro sensor, a pressure sensor, a magnetic sensor, an acceleration sensor, a terrestrial sensor, a motion recognition sensor, a grip sensor, a proximity sensor, a color sensor (for example, RGB (red, green, blue) sensor), a medical sensor, a temperature-humidity sensor, a Ultra Violet (UV) sensor, and a Heart Rate Monitor (HRM) sensor. In addition, the sensor may include, for example, an E-nose sensor, an electromyography (EMG) sensor, an electroencephalogram (EEG) sensor, an electrocardiogram (ECG) sensor and an infrared (IR) sensor. According to an embodiment of the present disclosure, the electronic device 100 may further include a processor which is configured to control the sensor as a part of the controller 180 or separately from the processor to control the sensor while the controller 180 is in a sleep state.

The user input unit 120 may be implemented in the form of buttons located outside the electronic device 100 or some or all of the user input unit 120 may be implemented in the form of a touch panel. The user input unit 120 may receive a user input for initiating the operation of the electronic device 100 according to various embodiments of the present disclosure and generate an input signal according to the user input. For example, the user input unit 120 may receive various user inputs for selecting data, performing data communication, performing full duplex communication, executing an application, inputting (making or inserting) data, making a change in a position of the electronic device 100, displaying content, connecting to a network, and transmitting or receiving data and may generate an input signal according to the user input.

The touch screen 130 is an input/output means for simultaneously performing an input function and a display function and may include a display 131 and a touch detection unit 133. The touch screen 130 may provide an input/output interface between the electronic device 100 and the user, transfer a user's touch input to the electronic device 100 and serve as a medium that shows an output from the electronic device 100 to the user. The touch screen 130 may show a visual output to the user. The visual output may be in the form of text, graphic, video, or a combination thereof. For example, in various embodiments of the present disclosure, the touch screen 130 may display various screens according to the operation of the electronic device 100 through the display 131. The various screens may include, for example, a data communication screen, a full duplex communication screen, a data selection screen, an operation role (for example, host or slave) configuration screen, a messenger screen, a call screen, a game screen, a dynamic image reproduction screen, a gallery screen, a webpage screen, a home screen or an electronic device connection screen.

The touch screen 130 may detect a touch event, a hovering event, or an air gesture event based on at least one of a touch, hovering, and air gesture from the user through the touch detection unit 133 while a particular screen is displayed through the display 131 and transmit an input signal according to the event to the controller 180. The controller 180 may distinguish the transferred event and control an operation according to the distinguished event.

The display 131 may display (output) various pieces of information processed by the electronic device 100. For example, the display 131 may display a User Interface (UI) or a Graphical UI (GUI), related to the operation (for example, host or slave) performed by the electronic device 100 in full duplex communication mode. Further, the display 131 may display a UI or a GUI, related to a phone call when the electronic device 100 is in a phone call mode. When the electronic device 100 is in a video call mode or a photography mode, the display 131 may display a photograph or/and received image and a UI or a GUI, related to the operation of the corresponding mode. The display 131 may display data or content related to the use of the electronic device 100 or information on other electronic device connected to the electronic device 100. The display 131 may display various application execution screens corresponding to executed applications.

The display 131 may support a screen display in a landscape mode according to a rotation direction (or an orientation) of the electronic device 100, a screen display according a portrait mode, and a screen display according to a change between the landscape mode and the portrait mode. Various types of displays may be used as the display 131. For example, the display 131 may include a Liquid Crystal Display (LCD), a Light-Emitting Diode (LED) display, an Organic Light-Emitting Diode (OLED) display, a MicroElectroMechanical Systems (MEMS) display and an electronic paper display. Some of the displays may be implemented as a transparent display in a transparent or photo-transparent type.

The touch detection unit 133 may be located on the display 131 and may detect a user input which contacts or approaches the surface of the touch screen 130. The user input may include a touch event or a proximity event input based on at least one of a single-touch, a multi-touch, a hovering and an air gesture. For example, the user input may be made in the type of a tap, drag, sweep, flick, drag&drop, drawing gesture (for example, writing) and the like. The touch detection unit 133 may detect a user input (for example, a touch event or a proximity event) on the surface of the touch screen 130, generate a signal corresponding to the detected user input, and transfer the generated signal to the controller 180. The controller 180 may control execution of a function corresponding to an area where the user input is generated by the signal transferred from the touch detection unit 133.

The touch detection unit 133 may receive a user input for initiating the operation related to the use of the electronic device 100 and generate an input signal according to the user input in various embodiments of the present disclosure. The touch detection unit 133 may be configured to convert a change in pressure applied to a specific portion of the display 131 or a change in electrostatic capacitance generated at a specific portion of the display 131 into an electric input signal. The touch detection unit 133 may detect a location and an area of the surface of the display 131 which an input means (for example, a user's finger, an electronic pen, and the like) contacts or approaches. Further, the touch detection unit 133 may be implemented to also detect pressure when the touch is made according to the applied touch type. When there is a touch or proximity input on the touch detection unit 133, a signal(s) corresponding to the touch or proximity input may be transferred to a touch screen controller. The touch screen controller may process the signal(s), and then transmit corresponding data to the controller 180. Accordingly, the controller 180 may identify which area of the touch screen 130 is touched or approached and process execution of a function corresponding to the touch or proximity.

The audio processor 140 may transmit to a speaker (SPK) 141, an audio signal input from the controller 180 and may perform a function of transferring an audio signal such as a voice input from a microphone (MIC) 143 to the controller 180. The audio processor 140 may convert voice/sound data into an audible sound and output the audible sound through the speaker 141 under a control of the controller 180, and may convert an audio signal such as a voice received from the microphone 143 into a digital signal and transfer the digital signal to the controller 180. The audio processor 140 may output an audio signal corresponding to a user input according to audio processing information (for example, a sound effect, a music file, and the like) inserted into data.

The speaker 141 may output audio data received from the wireless communication unit 110 or stored in the memory 150. The speaker 141 may output sound signals related to various operations or functions performed by the electronic device 100. The speaker 141 may serve to output audio stream such as voice recognition, digital recording, and a phone call function. In an embodiment of the present disclosure, attachable and detachable earphones, headphone or headset may be connected to the speaker of the electronic device 100 through an external port.

The microphone 143 may receive an external sound signal and process the received sound signal to be voice data. In a call mode of the electronic device 100, the voice data processed through the microphone 143 may be converted into the form which can be transmitted to the outside through the mobile communication module 111. Various noise reduction algorithms may be implemented in the microphone 143 to remove noise generated during the process of receiving an external sound signal. The microphone 143 may serve to input audio such as voice recognition, digital recording, and a phone call function. For example, the microphone 143 may convert a voice signal into an electric signal. According to an embodiment of the present disclosure, the microphone 143 may include an internal microphone installed in the electronic device 100 or an external microphone connected to the electronic device 100.

The memory 150 may store one or more programs executed by the controller 180 and also perform a function of temporarily storing input/output data. The input/output data may include, for example, digital content, messenger data (for example, conversation data), contact information (for example, landline or mobile phone numbers), messages, media files (for example, audio, dynamic image, image, and picture files). According to an embodiment of the present disclosure, the memory 150 may store one or more pieces of information corresponding to performance of full duplex communication of the electronic device 100. For example, the memory 150 may store a preset reference value to determine data information on data used for data communication. According to an embodiment of the present disclosure, the reference value may be a value for determining at least some references among a data size (for example, the remaining capacity until data communication is completed) and an expected time required for data communication.

The memory 150 may store various programs or data related to the full duplex communication function of the electronic device 100. For example, according to an embodiment of the present disclosure, the memory 150 may store one or more programs for simultaneously processing first data communication by a first standard between electronic devices and second data communication by a second standard and data processed according to the programs.

The memory 150 may also store use frequency (for example, frequency of configuring the role of the electronic device (host or slave) in data communication, application use frequency, content use frequency, and the like), importance, and a priority according to the operation of the electronic device 100. The memory 150 may store data related to various patterns of vibration and sound output in response to a touch input or a proximity input on the touch screen 130. The memory 150 may permanently or temporarily store an Operating System (OS) of the electronic device 100, a program related to an input and display control of the touch screen 130, a program related to control of various operations or functions of the electronic device 100 and various pieces of data generated by the operations of the programs.

The memory 150 may include an extended external memory and an internal memory. The memory 150 may include at least one type of storage medium of a flash memory type memory, a hard disk type memory, a micro type memory, a card type memory (for example, a Secure Digital (SD) card, an eXtream Digital (XD) card, and the like), a Dynamic Random Access Memory (DRAM), a Static RAM (SRAM), a Read-Only Memory (ROM), a Programmable ROM (PROM), an Electrically Erasable PROM (EEPROM), a Magnetic RAM (MRAM), a magnetic disk and an optical disk. The electronic device 100 may also operate in relation to cloud storage performing a storage function of the memory 150 on the Internet.

The memory 150 may store various software components. For example, software components may include an operating system software module, a communication software module, a graphic software module, a user interface software module, a Moving Picture Experts Group (MPEG) module, a camera software module, and one or more application software modules. Further, since a module, which may be a software component, may be expressed as a set of instructions, the module is also expressed as an instruction set. The module may also be expressed as a program.

The operating system software module may include various software components for controlling a general system operation. Controlling the general system operation may refer to, for example, managing and controlling a memory and controlling and managing power. Further, the operating system software module may perform a function of smoothly executing communication between various hardware (devices) and the software component (modules).

The communication software module may allow the electronic device to communicate with another electronic device such as a computer, a server, or a portable terminal through the wireless communication unit 110. Further, the communication software module may be formed in a protocol structure corresponding to a corresponding communication scheme.

The graphic software module may include various software components for providing and displaying graphics on the touch screen 130. The term "graphics" refers to text, web page, icon, digital image, video, and animation.

The user interface software module may include various software components related to a User Interface (UI). For example, the user interface software module may include the content indicating how a state of the user interface is changed or indicating a condition under which the change in the state of the user interface is made.

The MPEG module may include a software component which enables digital content (for example, video and audio data) related process and functions (for example, generation, reproduction, distribution, and transmission of content).

The camera software module may include a camera related software components which enables a camera related process and functions.

The application module may include a web browser including a rendering engine, email, instant message, word processing, keyboard emulation, address book, widget, Digital Right Management (DRM), iris scan, context cognition, voice recognition, and a location-based service. According to various embodiments of the present disclosure, the application module may include instructions for performing full duplex communication. For example, the application module may process an operation for simultaneously performing first data communication by the first standard between electronic devices and second data communication by the second standard.

The interface unit 160 may serve as an interface between the electronic device 100 and all external devices connected to the electronic device 100. The interface unit 160 may receive data from an external device, receive power and transfer the power to respective components within the electronic device 100 or allow data within the electronic device 100 to be transmitted to the external device. For example, the interface unit 160 may include a wired/wireless headset port, an external charger port, a wired/wireless data port, a memory card port, a port for connecting a device provided with an identification module, an audio input/output port, a video input/output port, an earphone port, and the like.

According to an embodiment of the present disclosure, the interface unit 160 may include a type C USB interface. The interface unit 160 may support a connection with another electronic device, communication paths (for example, a first communication path and a second communication path) according to the first standard (for example, first standard (for example, USB 3.0) and second standard (for example, USB 2.0)), which are different from each other, and data communication based on at least some of the communication paths. For example, the interface unit 160 may simultaneously support the first data communication by the first communication path by the first standard between the electronic devices and the second data communication by the second communication path according to the second standard. According to an embodiment of the present disclosure, it is assumed that the first standard support data communication is of a higher speed than that of the second standard.

The camera module 170 corresponds to a component supporting a photography function of the electronic device 100. The camera module 170 may support capturing an image (a still image or a dynamic image) of a subject. The camera module 170 may photograph a predetermined subject according to a control of the controller 180 and transmit photographed data to the display 131 and the controller 180. The camera module 170 may include one or more image sensors. For example, the camera module 170 may include a front sensor such as a front camera located on the front surface of the electronic device 100 (the same plane as the display 131) and a rear sensor or camera located on the rear surface (for example, back surface) of the electronic device 100.

The controller 180 may control a general operation of the electronic device 100. For example, the controller 180 may perform a control related to voice communication, data communication, video communication, and the like. The controller 180 may include one or more processors or may be called a processor. For example, the controller 180 may include a Communication Processor (CP), an Application Processor (AP), an interface (for example, General Purpose Input/Output: GPIO), or an internal memory, as a separate component, or integrate them into one or more integrated circuits. The application processor may execute various software programs to perform various functions for the electronic device 100 and the communication processor may process and control voice communication and data communication. Further, the controller 180 may execute a particular software module (instruction set) stored in the memory 150 to serve various particular functions corresponding to the module.

According to an embodiment of the present disclosure, the controller 180 may control an operation related to performance of a full duplex communication function. For example, the controller 180 may control data communication between electronic devices connected through a USB interface (for example, the interface unit 160). According to an embodiment of the present disclosure, with respect to data communication, the controller 180 may simultaneously process first data communication for first data based on a first communication path according to a first standard (USB 3.0) and second data communication for second data based on a second communication path according to a second standard while the first data communication corresponding to the first data is performed. The control operation of the controller 180 according to various embodiments of the present disclosure will be described with reference to the drawings described below.

According to an embodiment of the present disclosure, the controller 180 may perform a display control operation of the electronic device 100 according to an embodiment of the present disclosure through an interworking with software modules stored in the memory 150. The controller 180 may be implemented by one or more modules which may process the various functions.

The controller 180 may be implemented by one or more processors that control the operation of the electronic device 100 by executing one or more programs stored in the memory 150. For example, the controller 180 may include an operation configuration module 181, an event detection module 183, and a data processing module 185.

The operation configuration module 181 may configure an operation (role) according to performance of data communication of the electronic device based on a user input. For example, in an operation of initiating first data communication and an operation of performing second data communication in parallel during the first data communication, the operation configuration module 181 may configure the electronic device to operate as a host or a slave based on the user input.

The event detection module 183 may detect an event related to execution of full duplex communication during the first data communication. For example, the event detection module 183 may detect the event when a switch item described below is selected based on a user interface during the first data communication or a user gesture for executing full duplex communication is detected. Further, the event detection module 183 may detect the event when a request for communication of the second data is received according to BMC communication through a CC pin of the USB interface. A connection state may be detected through Configuration Channels (CC) (for example, CC1 or CC2) pin (terminal).

The data processing module 185 may process data transmission or reception in accordance with the role (for example, host or slave) configured in the electronic device for the corresponding data when data communication or full duplex communication is performed. The data processing module 185 may process transmission or reception by the first communication path for the first data corresponding to the first data communication. The data processing module 185 may process transmission or reception by the second communication path for the second data corresponding to the second data communication in response to the detection of the event by the event detection module 183 while the first data communication is processed. The data processing module 185 may process the second data communication for the second data based on the second communication path according to the second standard in parallel while continuously processing the first data communication corresponding to the first data in accordance with the event by the event detection module 183.

The controller 180 according to an embodiment of the present disclosure may control various operations related to general functions of the electronic device 100 as well as the above described functions. For example, when a particular application is executed, the controller 180 may control an operation and a screen display of the particular application. Further, the controller 180 may receive input signals corresponding to various touch event or proximity event inputs supported by a touch-based or proximity-based input interface (for example, the touch screen 130) and may control execution of functions according to the received input signals. In addition, the controller 180 may control transmission/reception of various types of data based on wired communication or wireless communication.

The power supply unit 190 may receive external power and internal power and may supply the power required for an operation of each component under the control of the controller 180. In an embodiment of the present disclosure, the power supply unit 190 may supply or block (on/off) power to the display 131 and the camera module 170 under a control of the controller 180.

The various embodiments of the present disclosure may be implemented in a recording medium, which can be read through a computer or a similar device, by using software, hardware, or a combination thereof. According to the hardware implementation, the embodiments of the present disclosure may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and electrical units for performing other functions.

According to an embodiment of the present disclosure, the recording medium may include a computer-readable recording medium having a program recorded therein to execute an operation of processing data communication for first data based on a first communication path according to a first standard between electronic devices connected through interfaces and an operation of processing data communication for second data based on a second communication path according to a second standard while the data communication for the first data is performed.

In some cases, the embodiments described in the present specification may be implemented by the controller 180. Furthermore, according to the software implementation, the embodiments such as procedures and functions described in the present specification may also be implemented as separate software modules. The software modules may perform one or more functions and operations described in the present specification.

Figure 2:
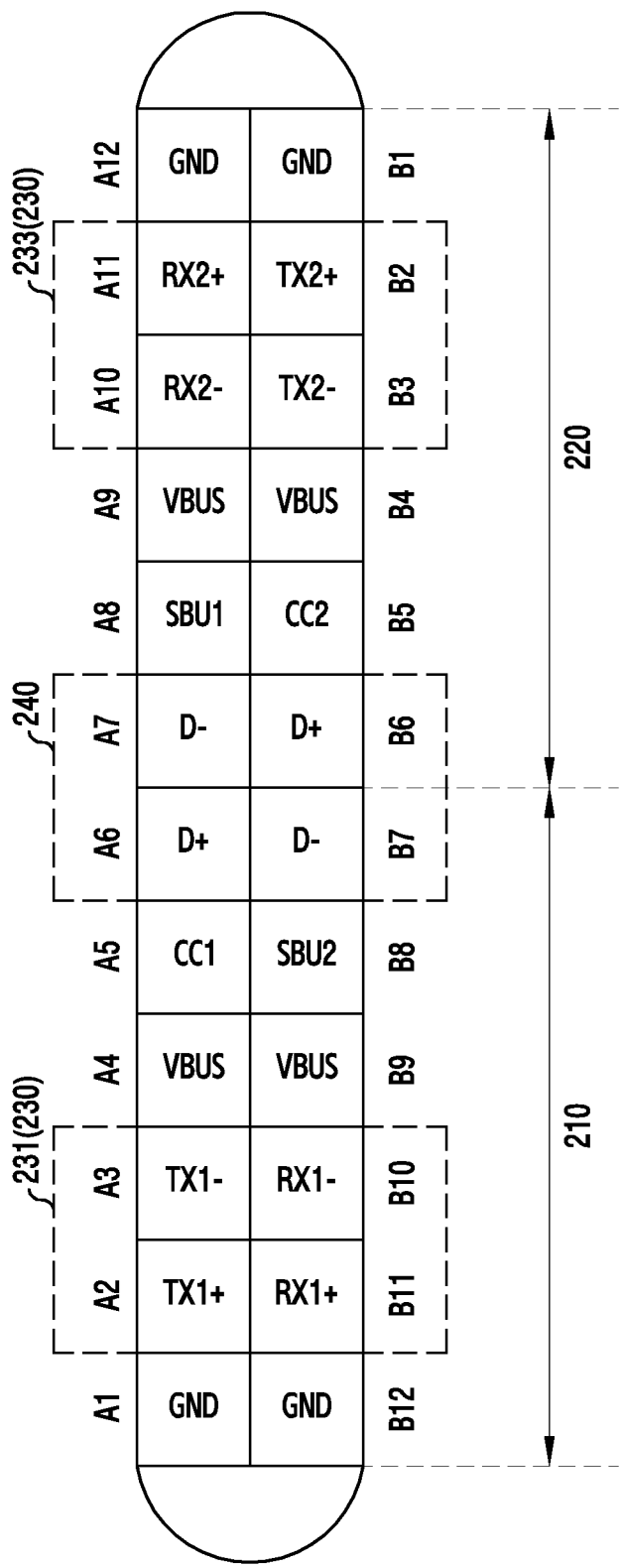
FIG. 2 illustrates a configuration example of a USB interface of an electronic device according to an embodiment of the present disclosure.

FIG. 2 illustrates a USB interface supported by the electronic device and an operation thereof according to an embodiment of the present disclosure as illustrated in FIG. 2.

FIG. 2 illustrates an example of a structure of a functional pin of a type C USB interface used in the embodiment of the present disclosure.

Referring to FIG. 2, FIG. 2 illustrates an example of a structure of an input/output pin of the USB interface (for example, USB type C). The USB interface may be largely divided into a first part 210 and a second part 220 and the first part 210 and the second part 220 may have a symmetrical structure. The USB interface of the electronic device may be connected to a USB cable based on the symmetrical structure regardless of connectivity. For example, since connectors at both ends of the USB cable may have the same shape (form) and the connector does not distinguish between top and bottom, the immediate connection is possible without the need to match pin directivity of the connector. For example, the USB interface may be connected right-side-up (with the first part 210 up) or inversely, the USB interface may be connected upside-down (with the first part 210 down). A connection state may be detected through Configuration Channels (CC) (for example, CC1 or CC2) pin (terminal). According to an embodiment of the present disclosure, when pull-down is detected in a CC1 pin (A5) of the USB interface (CC1 is connected to ground), the first part 210 may be in a plugged-in state. When pull-down is detected in a CC2 pin (B5) of the USB interface (CC2 is connected to ground), the second part 220 may be in a plugged-in state.

The USB interface may include, for example, a total of 24 designated pins (for example, A1 to A12 and B1 to B12) and each of the 24 pins may have its own role as illustrated in FIG. 2.

The USB interface may support, for example, data communication at different transmission rates. For example, the USB interface may include a first communication path 230 corresponding to a first standard (USB 3.0) supporting high speed data communication and a second communication path 240 corresponding to a second standard (USB 2.0) supporting low speed data communication. The first communication path 230 of USB 3.0 may consist of one pair 231 in the first part 210 and the other pair 233 in the second part 220. The second communication path 240 USB 2.0 may consist of one pair 241 in the first part 210 and the other pair 243 in the second part 220. That is, the first communication path 230 and the second communication path 240 may be symmetrically implemented in the first part 210 and the second part 220 in accordance with the symmetrical structure of the USB interface.

When the electronic devices are connected to each other through the USB interface, the electronic devices may operate as the host (for example, Downstream Facing Port: DFP) or the slave (for example, Upstream Facing Port: UFP) and whether to operate as the host or the slave may be determined through the CC (for example, CC1 or CC2) terminal of the USB interface. Further, the electronic devices may operate as a Dual Role Port (DRP) as well as the host (DFP) and the slave (UFP). The DRP may indicate a mode (function) in which the roles of the host (DFP) and the slave (UFP) can be adaptively changed. For example, when the DRP is connected as the host (DFP), the DRP may be changed to the slave (UFP). When the DRP is connected as the slave (UFP), the DRP may be changed to the host (DFP). Further, when two DRP are connected together, one DRP may serve as the host (DFP) and the other DRP may serve as the slave (UFP) in a random manner.

A $V_{BUS}$ of the USB interface may indicate a power supply terminal and support power corresponding to each USB standard illustrated in Table 1 below.

TABLE 1

| Mode of Operation | Nominal Voltage | Maximum Current | Notes |
|---|---|---|---|
| USB 2.0 | 5 V | 500 mA | Default Current, based on definitions in the base specifications |
| USB 3.1 | 5 V | 900 mA | Legacy charging |
| USB BC 1.2 | 5 V | Up to 1.5 A | Supports higher power devices |
| USB Type-C Current @ 1.5 A | 5 V | 1.5 A | Supports higher power devices |
| USB Type-C Current @ 3.0 A | 5 V | 3 A | Supports higher power devices |
| USBPD | Configurable up to 20 V | Configurable up to 5 A | Directional control and power level management |

As shown in Table 1 above, the USB interface according to an embodiment of the present disclosure may support power capability up to 5 V at 3 A. When USB Power Delivery (PD) is combined with the USB type C, the USB interface may support power capability up to 20 V/5 A. A USB PD protocol may be transmitted through a CC line connection.

In general, when the electronic devices are designated as the host (DFP) and the slave (UFP), the electronic device operating as the host may transfer data to the electronic device operating as the slave and first transmit data through the transmission port of the first standard (USB 3.0) having two pairs of pins (for example, the first communication path 230) in the USB interface. Alternatively, when the electronic devices is not compatible with the first standard, data may be transmitted through the transmission port of the second standard (USB 2.0) having one pair of pins (for example, the second communication path 240).

The USB interface may include data communication paths corresponding to different standards for data transmission as described above. The USB interface may be divided into the first communication path 230 for data communication (for example, high speed communication) based on a communication speed according to the first standard (USB 3.0) and the second communication path 240 for data communication (for example, low speed communication) based on a communication speed according to the second standard (USB 2.0). When the electronic devices are connected through the USB interface and the electronic device operating as the host transmits data to the electronic device operating as the slave, data communication may be performed preferentially through the first communication path 230 of the first standard having a higher priority (for example, the path of the standard having a higher data transmission rate is first configured).

According to an embodiment of the present disclosure, when additional data communication is requested by the first electronic device or the second electronic device while data communication (for example, data transmission from the first electronic device operating as the host to the second electronic device operating as the slave) is performed by the first communication path 230 according to the first standard, the request for the data communication can be supported.

According to an embodiment of the present disclosure, when additional data transmission is requested while data communication is performed by the first communication path 230 according to the first standard, reverse data transmission (for example, slave to host) may be supported based on the second communication path 240 while forward data transmission (for example, host to slave) by the first communication path 230 is maintained. That is, according to an embodiment of the present disclosure, when there is a request for transmission of second data from the second electronic device while the first electronic device correspond-ing to the host uni-directionally transmits data to the second electronic device corresponding to the slave, the roles of the host and the slave are changed between the electronic devices for the second data and the second data may be transmitted in a different direction while a connection state between the electronic devices is maintained. This will be described with reference to FIGS. 3 and 4.

According to an embodiment of the present disclosure, while the first electronic device corresponding to the host transmits first data to the second electronic device corresponding to the slave, the first electronic device may additionally transmit second data. For example, when there is a request for transmission of the second data from the first electronic device while the first electronic device transmits the first data through the first communication path 230 according to the first standard, the first electronic device may transmit the second data to the second communication path 240 according to the second standard.

Figure 3:
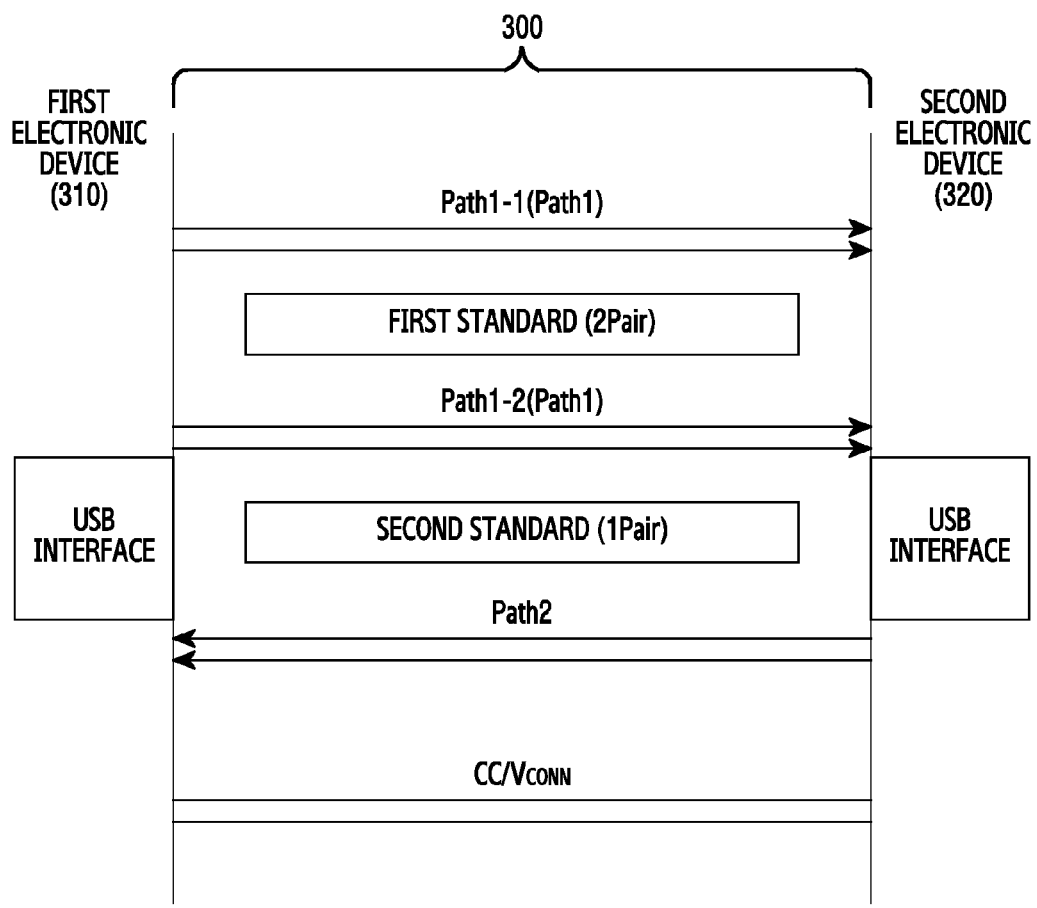
FIG. 3 illustrates data transmission paths of electronic devices divided into a host and a slave according to an embodiment of the present disclosure.
Figure 4:
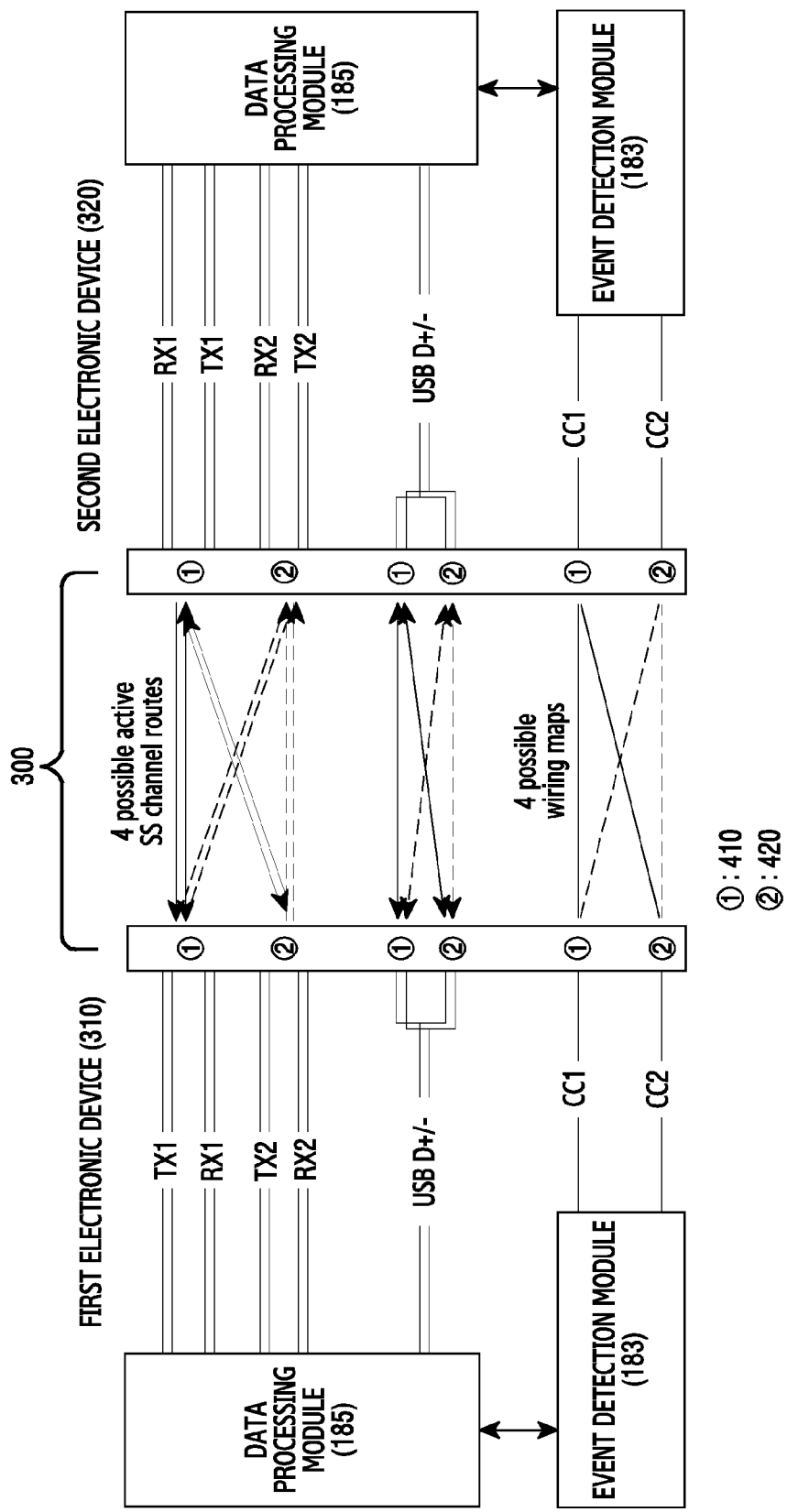
FIG. 4 illustrates operations of electronic devices divided into a host and a slave according to an embodiment of the present disclosure.

FIGS. 3 and 4 illustrate data transmission directions of electronic devices divided into the host and the slave according to an embodiment of the present disclosure.

As illustrated in FIGS. 3 and 4, FIG. 3 illustrates an example for describing data transmission directions of the electronic devices divided into the host and the slave when the electronic devices are connected through the USB interface. In FIGS. 3 and 4, each of a first electronic device 310 and a second electronic device 320 may include all or some of the components of the electronic device 100 illustrated in FIG. 1, and may be the same type as or a different type from the electronic device 100.

Referring to FIGS. 3 and 4, in an embodiment of the present disclosure, the electronic devices (for example, the first electronic device 310 and the second electronic device 320) may activate a different data transmission function in BMC communication through the CC terminal of the USB interface. For example, while first data is transmitted in one direction (for example, first communication path supporting the first standard (USB 3.0)) by the BMC protocol through the CC pin (terminal) (for example, CC1 or CC2) when the electronic devices are connected through the USB interface, data transmission in a different direction (for example, second communication path supporting the second standard (USB 2.0)) may be activated through the BMC communication and the second data may be transmitted in the opposite direction.

According to an embodiment of the present disclosure, in the USB interface standard, a 1 wire protocol may be supported through the CC terminal and the host (DFP) and the slave (UFP) of the second standard (USB 2.0) may be designated in a direction opposite to the transmission direction of data transmitted through the terminal (for example, first communication path) of the current first standard (USB 3.0) through the 1 wire protocol using the BMC. According to an embodiment of the present disclosure, the host/slave (DFP/UFP) of the second standard (for example, USB 2.0) designated through the BMC may be formed in a direction opposite to that of the host/slave (DFP/UFP) of the first standard (USB 3.0).

The USB interface may include two CC pins (for example, CC1 and CC2). When one of the CC pins (for example, CC1) is used for a connection between the first electronic device 310 (for example, DFP) and the second electronic device 320 (for example, UFP), the other CC pin (for example, CC2) may be used for supplying power to a USB cable 300. For example, the CC pin used for supplying the power may be defined as $V_{CONN}$. According to an embodiment of the present disclosure, when the CC pin of the first electronic device 310 (for example, DFP) detects pull-down (pin connected to ground), the CC pin of the cable 300 may switched to the $V_{CONN}$ in pull-up (pin connected to power).

In FIGS. 3 and 4, the first electronic device 310 (for example, DFP) may indicate a part of the electronic device serving as the host, and the second electronic device 320 (for example, UFP) may indicate a part of the electronic device serving as the slave. Before the first electronic device 310 and the second electronic device 320 are connected through the USB interface, a $V_{BUS}$ source of the first electronic device 310 has no output. After the first electronic device 310 and the second electronic device 320 are connected through the USB interface, a voltage level of the CC pin may be dropped in the first electronic device 310 by a pull-down resistor and accordingly, a connection of the second electronic device 320 may be recognized. According to an embodiment of the present disclosure, the first electronic device 310 may recognize a connection state according to a state of CC1 or CC2 as shown in an example of Table 2.

TABLE 2

| CC1 | CC2 | State | Position |
|---|---|---|---|
| Open | Open | Nothing connected | N/A |
| Rd | Open | UFP connected | ① |
| Open | Rd | UFP connected | ② |
| Open | Ra | Powered Cable/No UFP connected | ① |
| Ra | Open | Powered Cable/No UFP connected | ② |
| Rd | Ra | Powered Cable/UFP connected | ① |
| Ra | Rd | Powered Cable/UFP connected | ② |
| Rd | Rd | Debug Accessory Mode connected (Appendix B) | N/A |
| Ra | Ra | Audio Adapter Accessory Mode connected (Appendix A) | N/A |

Table 2 shows an example of connection states detected in the first electronic device 310 (for example, host (DFP). For example, when CC1 and CC2 are in an open/open state, the electronic devices may be the form of host-to-host (DFP-to-DFP) and slave-to-slave (UFP-to-UFP) and the second electronic device 320 (for example, slave (UFP) has no connection. When CC1 and CC2 are in an Rd/open state or an open/Rd state, the electronic devices may be the form of host-to-slave (DFP-to-UFP) or slave-to-host (UFP-to-DFP) and the second electronic device 320 (for example, slave (UFP) may be in a connected state. Examples of such states are illustrated in FIG. 4. For example, when CC1 is in the pull-down state and CC2 is in the open state, the electronic devices may perform data communication based on a communication path of position 1 410. Alternatively, when CC1 is in the open state and CC2 is in the pull-down state, the electronic devices may perform data communication based on a communication path of position 2 420.

Further, when a voltage is applied to CC1 or CC2 due to resistance (for example, Ra) by the cable 300 and the other one is in the pull-down state, a connection state of a powered cable may be detected or data communication may be performed based on the communication path of position 1 410 or position 2 420. In contrast, when a voltage is applied to CC1 or CC2 due to resistance (for example, Ra) by the cable 300 and the other one is in the open state, only the connection state of the powered cable may be detected.

Further, when both CC1 and CC2 are in the pull-down state or both CC1 and CC2 apply the voltage to the cable 300, an operation corresponding to a predefined mode may be performed. For example, when both CC1 and CC2 are in the pull-down state, a debug accessory mode may be executed. When both CC1 and CC2 apply the voltage to the cable, an audio adaptor accessory mode may be executed.

According to an embodiment of the present disclosure, the full duplex communication may be performed based on the USB operation described above. According to an embodiment of the present disclosure, during first data communication from the host to the slave through the USB interface, second data communication from the slave to the host or second data transmission from the host to the slave may be supported. For example, the first electronic device 310 and the second electronic device 320 may process the first data communication for the first data based on the first communication path according to the first standard (USB 3.0) through the data processing module 185.

The first electronic device 310 and the second electronic device 320 may detect an event (for example, a second data communication request according to BMC communication) by the CC pin (terminal) through the event detection module 183 while performing the first data communication. The first electronic device 310 and the second electronic device 320 may process second data communication for the second data based on the second communication path according to the second standard (USB 2.0) by the data processing module 185 in response to the event through the event detection module 183. The second data communication may be processed in parallel while the first data communication is continuously maintained.

According to an embodiment of the present disclosure, the first electronic device 310 and the second electronic device 320 may be connected through the USB interface. The first electronic device 310 and the second electronic device 320 may support a DRP mode. Before the host (DFP) and the slave (UFP) are defined (configured) by the user, power (for example, $V_{BUS}$ power) may not be supplied to the USB interface and exist in a standby state. Thereafter, when the host and the slave are designated by the user based on the controller 180 or a User Interface (UI) displayed through the display (for example, the display 131 of FIG. 1), the first electronic device 310 and the second electronic device 320 supply power and first data selected by the user in the electronic device (for example, the first electronic device 310) corresponding to the host may be transmitted to the electronic device (for example, second electronic device 320) corresponding to the slave through the data communication path (for example, the first communication path having a higher priority (for example, first standard) of the USB interface.

As described above, second data communication for second data of the second electronic device 320 may be requested by the controller 180 or the user while the first data communication for the first data is performed in accordance with the roles of the host and the slave between the first electronic device 310 and the second electronic device 320. For example, the user may generate a user input for instructing transmission of second data by selecting the second data based on a user interface displayed through the display 131 of the second electronic device 320.

The second electronic device 320 may recognize initiation of data communication for the second data in response to the user input and activate a different data path (for example, second communication path of a next priority (for example, second standard) of the USB interface. According to an embodiment, the second electronic device 320 may activate the second communication path for data transmission of the second data with the first electronic device 310 through BMC communication using the CC terminal of the USB interface.

The second electronic device 320 may change the roles of the host and the slave between the first electronic device 310 and the second electronic device 320 only for the second data and perform second data communication for the second data based on the activated second communication path. The first data communication for the first data, which is previously performed, may be maintained. That is, the roles of the host and the slave for the first data may be maintained and the first data communication by the first communication path may be continuously performed until the transmission of the first data is completed.

FIGS. 5, 6, 7, 8, 9 and 10 illustrate operations corresponding to performance of full duplex communication of the electronic device and screen shots thereof according to an embodiment of the present disclosure.

Figure 5:
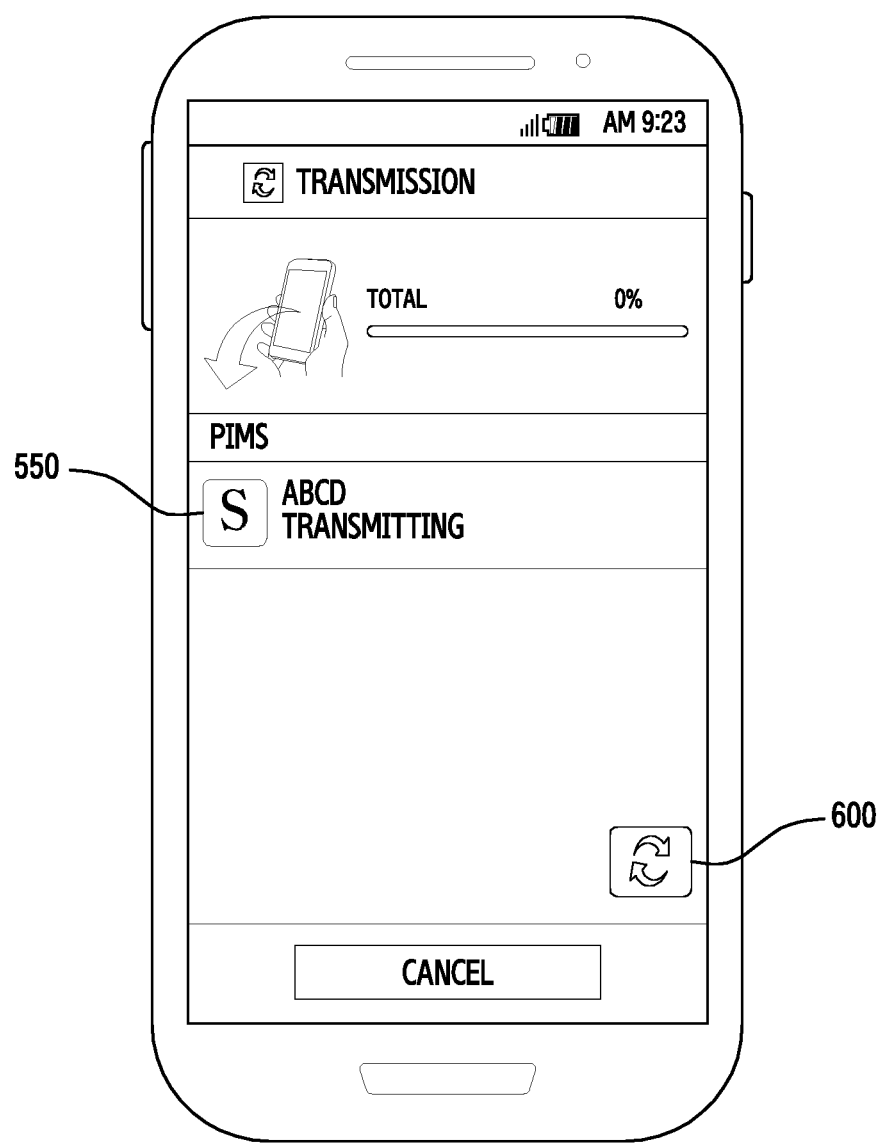
FIGS. 5, 6, 7, 8, 9, and 10 illustrate operations corresponding to performance of full duplex communication of the electronic device and screen shots thereof according to an embodiment of the present disclosure.
Figure 6:
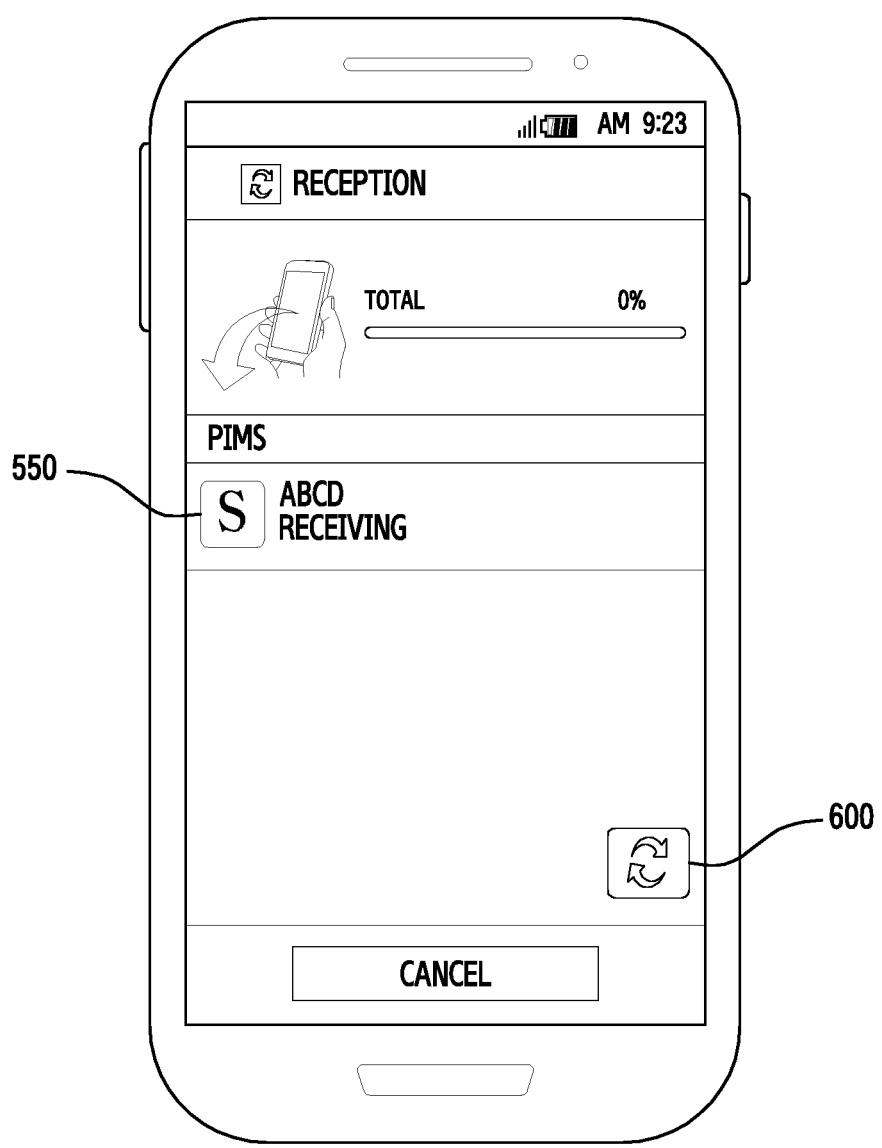

FIGS. 5 and 6 illustrate operation screen shots of the electronic devices while the first electronic device (see FIG. 5) operating as the host and the second electronic device (see FIG. 6) operating as the slave are connected through the USB interface and perform data communication. According to an embodiment of the present disclosure, FIG. 5 illustrates an example in which the first electronic device initiates transmission of data (for example, first data (ABCD)) to the second electronic device and displays a user interface related to the data transmission. FIG. 6 illustrates an example in which the second electronic device initiates reception of the data (for example, first data (ABCD)) transmitted by the first electronic device and displays a user interface related to the data reception.

In FIGS. 5 and 6, each of a first electronic device and a second electronic device may include all or some of the components of the electronic device 100 illustrated in FIG. 1, and may be the same type as or a different type as the electronic device 100. According to an embodiment of the present disclosure, the first electronic device and the second electronic device can support a DRP mode and may be connected through the USB interface of the electronic devices by using the USB cable as described above. The first electronic device and the second electronic device may identify whether to operate as the host or the slave by displaying a user interface related to data communication when the first electronic device and the second electronic device are connected based on the USB interface. The user may configure the first electronic device and the second electronic device as the host or the slave based on the user interface.

When the host and slave roles are configured in the first electronic device and the second electronic device by the user, data communication may be performed in accordance with the configuration. According to an embodiment of the present disclosure, the first electronic device may initiate data transmission selected by the user through the first communication path (for example, high speed data transmission path) supporting the first standard (USB 3.0) and the second electronic device may initiate reception of the data transmitted by the first electronic device through the first communication path (for example, high speed data transmission path) supporting the first standard (USB 3.0).

The first electronic device and the second electronic device may display user interfaces corresponding to the data transmission and the data reception when data communication is performed. According to an embodiment of the present disclosure, a user interface (see FIG. 5) including a progress state of the data transmission may be provided to the first electronic device and a user interface (see FIG. 6) including a progress state of the data reception may be provided to the second electronic device. As illustrated in FIG. 5, the first electronic device operating as the host may display data (for example, first data (ABCD) 550) used for data communication and a communication state (for example, transmitting) of the data. As illustrated in FIG. 6, the second electronic device operating as the slave may display data (for example, first data (ABCD) 550) used for data communication and a communication state (for example, receiving) of the data.

According to an embodiment of the present disclosure, the user interfaces related to the data transmission and the data reception may provide a switch item 600 for initiating full duplex communication between the electronic devices. The switch item 600 may indicate, for example, an item for executing additional data communication for another piece of data other than the data for which the data communication is being performed.

According to an embodiment of the present disclosure, the switch item 600 may execute a full duplex communication function according to a user input and display a related user interface (for example, a user interface related to configuring the host and slave for the data communication in an initial connection through the USB interface and selecting target data) in response to the execution of the full duplex communication function. The user may configure the host and the slave between the electronic devices based on the user interface and may simultaneously perform the data communication for the other piece of data together with the data communication which is currently being performed, by selecting the other piece of data for transmission.

The electronic device may perform the full duplex communication function by the switch item 600 during the currently performed data communication and operate as the host or the slave according to the user input. The electronic device may perform the full duplex communication function automatically without user input. The electronic devices may process transmission or reception of the other piece of data based on a second communication path different from the first communication path of the currently performed data communication in accordance with the operation of the host or slave.

For example, while transmitting the first data (for example, dynamic image file) to the second electronic device, the first electronic device may desire to additionally transmit second data (for example, audio file, picture file, memo, contacts and the like) to the second electronic device. While transmitting the first data to the second electronic device, the user may desire to additionally transmit second data of the second electronic device to the first electronic device.

According to an embodiment of the present disclosure, when the first electronic device operating as the host for the data communication of the first data detects selection of the switch item 600 while transmitting the first data based on the first communication path according to the first standard (USB 3.0), the second communication path according to the second standard (USB 2.0) may be automatically activated through BMC communication of the CC terminal. The first electronic device may perform data communication with the second data selected by the user based on the second communication path. The first electronic device may operate as the host or the slave according to a user's setting for the data communication of the second data.

According to an embodiment of the present disclosure, when the first electronic device operates as the slave for the data communication of the second data, the roles of the host and the slave conventionally configured between the first electronic device and the second electronic device may be changed only for the data communication of the second data. That is, the first electronic device may receive the second data by the second communication path according to the second standard (USB 2.0) while continuously transmitting the first data by the first communication path according to the first standard (USB 3.0). A screen shot thereof is illustrated in FIG. 7.

Figure 7:
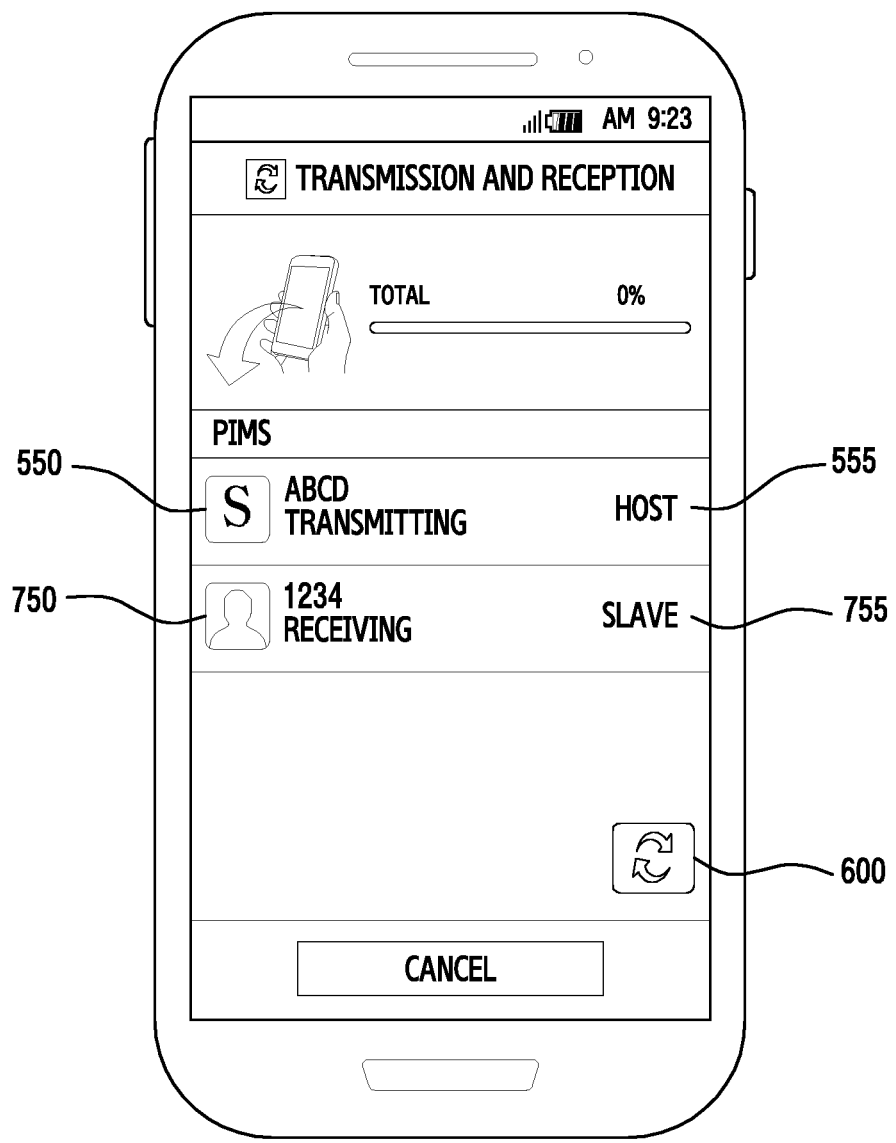

As illustrated in FIG. 7, when full duplex communication (for example, data transmission of first data by the host and data reception of second data by the slave) is performed, the first electronic device may display data (for example, first data (ABCD) 550 and second data (1234) 750) used for the data communication and communication states (for example, transmitting and receiving) of the corresponding data 550 and 750 and also display operation information (for example, HOST 555 and SLAVE 755) on the first electronic device for the corresponding data. In the example of FIG. 7, when the first electronic device performs the full duplex communication, displaying of the switch item 600 may be omitted or displayed in an inactive state. Further, displaying of the operation information 555 and 755 may be omitted according to a setting of the electronic device.

According to an embodiment of the present disclosure, when the first electronic device operates as the slave for the data communication of the second data, the roles of the host and the slave conventionally configured between the first electronic device and the second electronic device may be maintained for the data communication of the second data. That is, the first electronic device may transmit the second data by the second communication path according to the second standard (for example, USB 2.0) while continuously transmitting the first data by the first communication path according to the first standard (for example, USB 3.0). A screen shot thereof is illustrated in FIG. 8.

Figure 8:
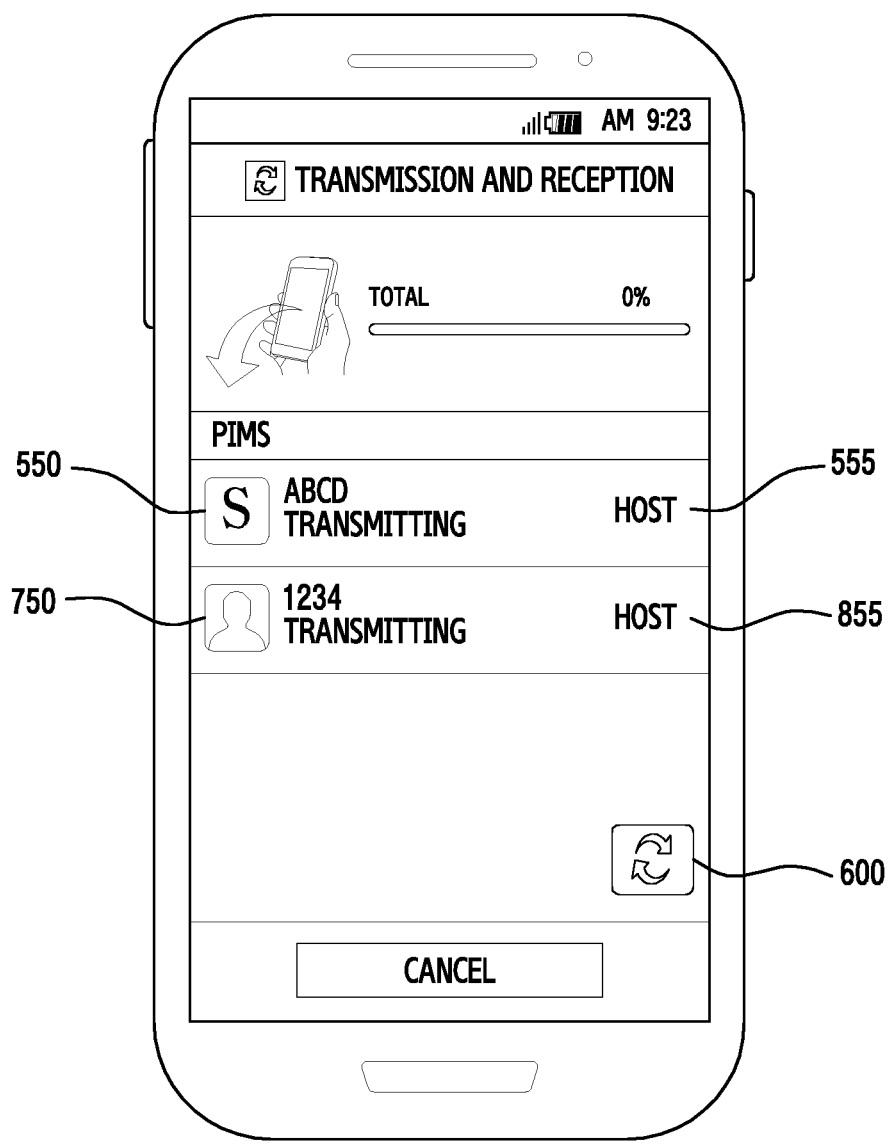

As illustrated in FIG. 8, when full duplex communication (for example, data transmission of first data by the host and data transmission of second data by the host) is performed, the first electronic device may display data (for example, first data (ABCD) 550 and second data (1234) 750) used for the data communication and communication states (for example, transmitting and transmitting) of the corresponding data 550 and 750 and also display operation information (for example, HOST 555 and HOST 855) on the first electronic device for the corresponding data. In the example of FIG. 8, when the first electronic device performs the full duplex communication, displaying of the switch item 600 may be omitted or displayed in an inactive state. Further, displaying of the operation information 555 and 855 may be omitted according to a setting of the electronic device.

According to an embodiment of the present disclosure, when the second electronic device operating as the slave for the data communication of the first data detects selection of the switch item 600 while receiving the first data based on the first communication path according to the first standard (USB 3.0), the second communication path according to the second standard (USB 2.0) may be automatically activated through BMC communication of the CC terminal. The second electronic device may perform data communication of the second data selected by the user based on the second communication path. The second electronic device may operate as the host or the slave according to a user's setting for the data communication of the second data.

According to an embodiment of the present disclosure, when the second electronic device operates as the host for the data communication of the second data, the roles of the host and the slave conventionally configured between the first electronic device and the second electronic device may be changed only for the data communication of the second data. That is, the second electronic device may transmit the second data by the second communication path according to the second standard (USB 2.0) while continuously receiving the first data by the first communication path according to the first standard (USB 3.0). A screen shot thereof is illustrated in FIG. 9.

Figure 9:
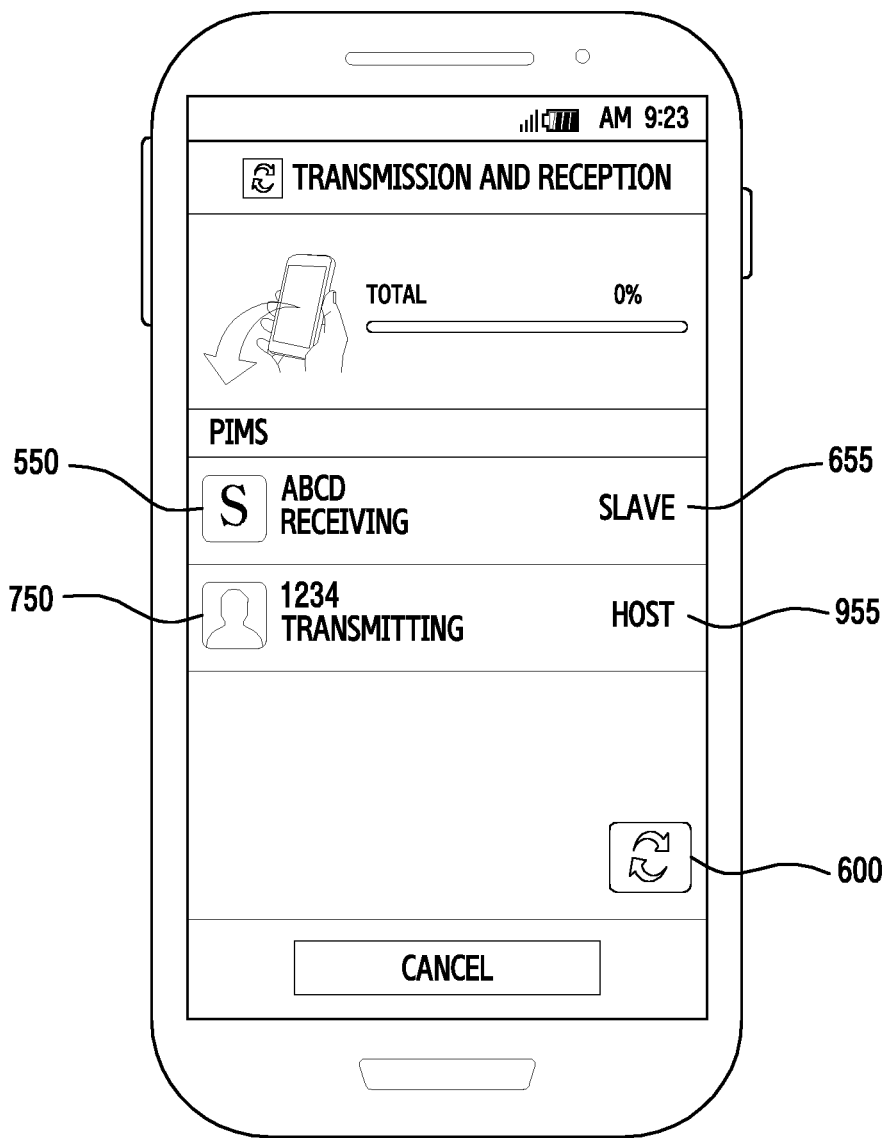

As illustrated in FIG. 9, when full duplex communication (for example, data reception of first data by the slave and data transmission of second data by the host) is performed, the second electronic device may display data (for example, first data (ABCD) 550 and second data (1234) 750) used for the data communication and communication states (for example, receiving and transmitting) of the corresponding data 550 and 750 and also display operation information (for example, SLAVE 655 and HOST 955) on the second electronic device for the corresponding data. In the example of FIG. 9, when the second electronic device performs the full duplex communication, displaying of the switch item 600 may be omitted or displayed in an inactive state. Further, displaying of the operation information 655 and 955 may be omitted according to a setting of the electronic device.

According to an embodiment of the present disclosure, when the second electronic device operates as the slave for the data communication of the second data, the roles of the host and the slave conventionally configured between the first electronic device and the second electronic device may be maintained for the data communication of the second data. That is, the second electronic device may receive the second data by the second communication path according to the second standard (USB 2.0) while continuously receiving the first data by the first communication path according to the first standard (USB 3.0). A screen shot thereof is illustrated in FIG. 10.

Figure 10:
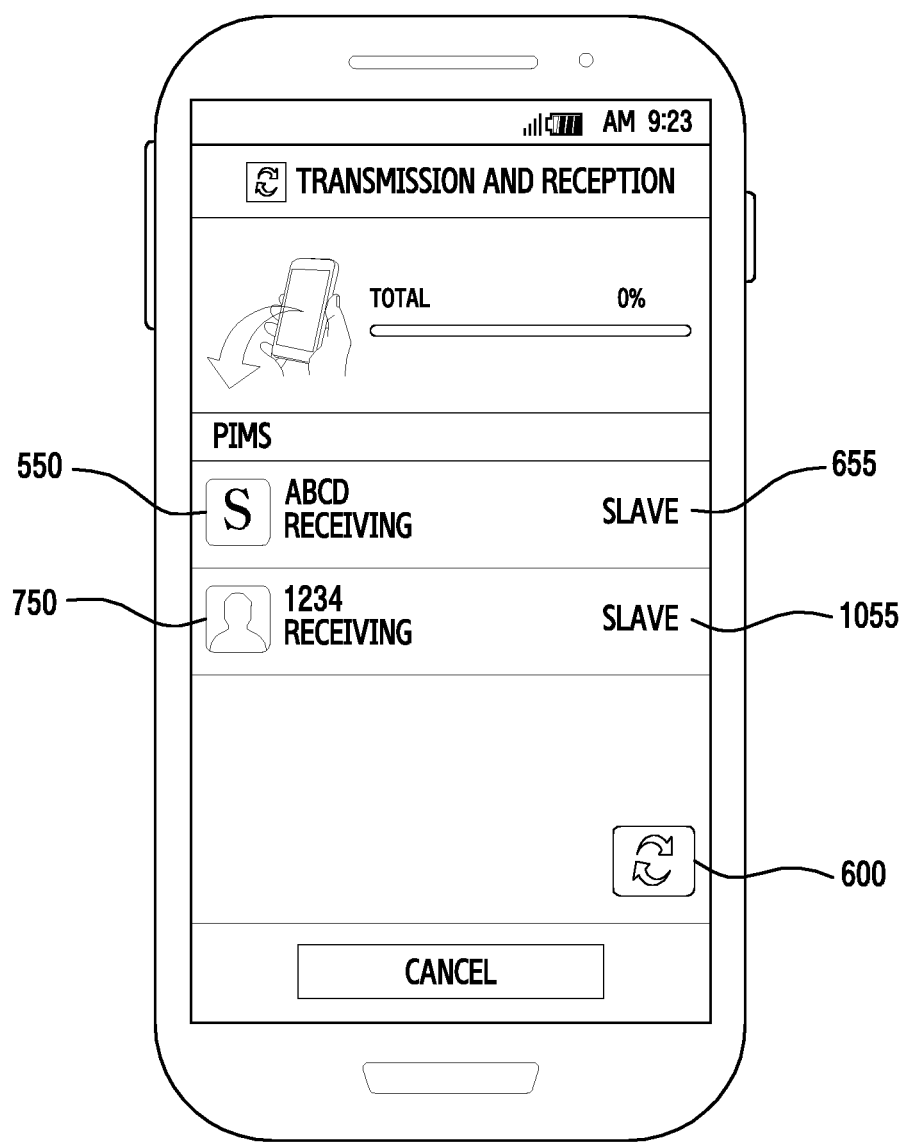

As illustrated in FIG. 10, when full duplex communication (for example, data reception of first data by the slave and data reception of second data by the slave) is performed, the second electronic device may display data (for example, first data (ABCD) 550 and second data (1234) 750) used for the data communication and communication states (for example, receiving and receiving) of the corresponding data 550 and 750 and also display operation information (for example, SLAVE 655 and SLAVE 1055) on the second electronic device for the corresponding data. In the example of FIG. 10, when the second electronic device performs the full duplex communication, displaying of the switch item 600 may be omitted or displayed in an inactive state. Further, displaying of the operation information 655 and 1055 may be omitted according to a setting of the electronic device.

The switch item 600 may be provided based on an icon, a menu, a widget and text in an embodiment of the present disclosure. Additionally or alternatively, the switch item 600 may be replaced with various user gesture inputs to initiate the full duplex data communication and the electronic device may automatically perform an operation corresponding to execution of a function by the switch item 600 in response to the user gesture input. The user gesture may include a motion-based gesture such as rotation of a position of the electronic device in a particular direction, a touch-based gesture of inputting a touch of a particular pattern on the touch screen and a sensor-based gesture of tracking and recognizing a user's biometric information (for example, information on the iris or fingerprint) through various sensors (for example, a camera module and a fingerprint scan sensor).

Figure 11:
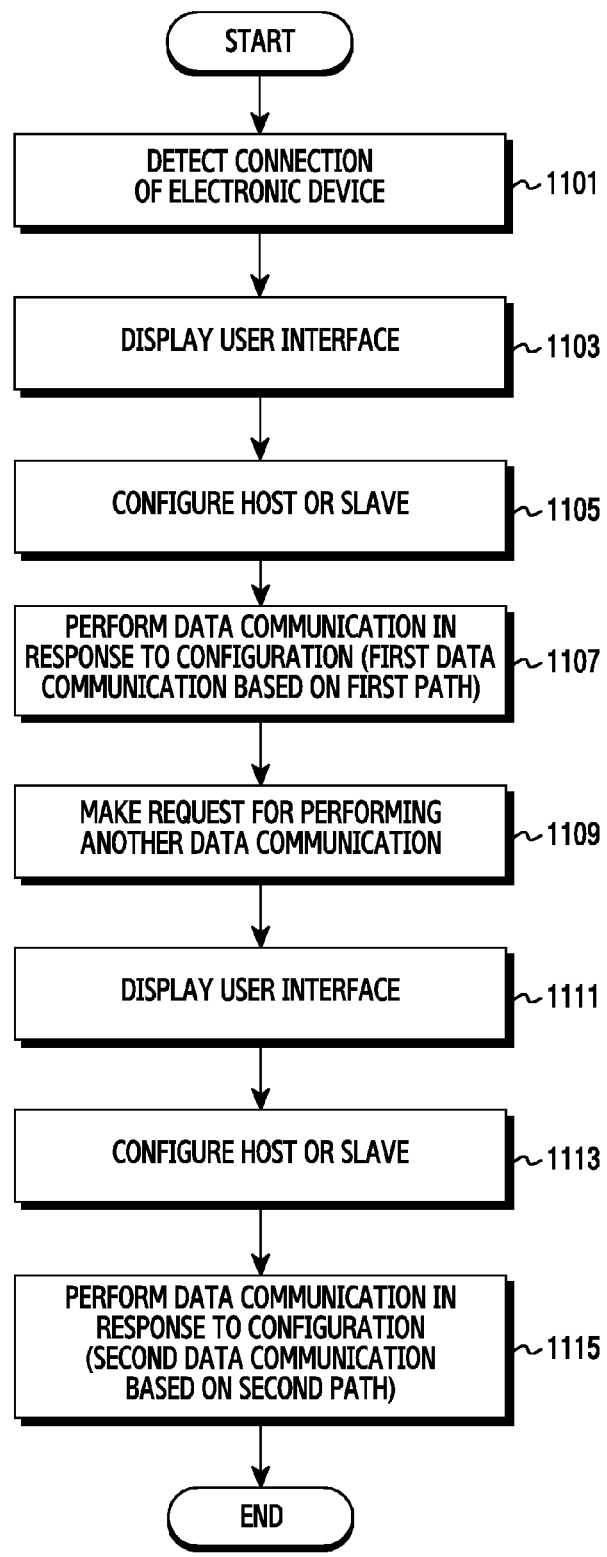
FIG. 11 is a flowchart illustrating a full duplex communication method of the electronic device according to an embodiment of the present disclosure.

FIG. 11 is a flowchart illustrating a full duplex communication method of the electronic device according to an embodiment of the present disclosure.

Referring to FIG. 11, in step 1101, the controller 180 detects a connection of another electronic device. For example, a first electronic device and a second electronic device may be connected through a USB interface and the controllers 180 of the first electronic device and the second electronic device may detect a connection of another electronic device accessed through the USB interface. According to an embodiment of the present disclosure, the first electronic device and the second electronic device may support a DRP mode and may be connected to each other through a USB cable that connects the USB interfaces of the first electronic device and the second electronic device.

In step 1103, the controller 180 may control displaying of a user interface. For example, the controller 180 may display a user interface related to configuration of an operation (role) of the electronic device and selection of data to be communicated in response to the detection of the connection of the other electronic device. The user interface may include various graphical elements for identifying whether the electronic device will operate as the host or the slave.

In step 1105, the controller 180 configures the host or the slave for data communication between the electronic devices based on a user input. For example, the controller 180 may receive a user input for configuring the electronic device to operate as the host or the slave based on the user interface and configure the operation (role) of the electronic device according to the user input.

In step 1107, when the operation (role) of the electronic device is configured, the controller 180 performs data communication according to the configuration. For example, the controller 180 may activate a first communication path of a first standard (USB 3.0) having a priority for data communication) with respect to first data (for example, a dynamic image file, picture file, music file, contacts and the like) selected based on the user interface and perform first data communication through the first communication path. According to an embodiment of the present disclosure, the first electronic device operating as the host may transmit data to the second electronic device operating as the slave through the first communication path of the first standard. The controller 180 may process displaying of a user interface related to the data communication when the data communication is initiated. The user interface may be provided, including the switch item 600.

In step 1109, the controller 180 detects a request for performing another data communication while the first data communication is performed. For example, the user may desire to transmit second data (for example, a picture file, music file, dynamic image file, contacts and the like) to the first electronic device from the second electronic device operating as the slave that receives the first data. Alternatively, the user may desire to transmit the second data to the second electronic device from the first electronic device operating as the host that transmits the first data. Accordingly, the user may generate a user input for performing full duplex communication by using the first electronic device or the second electronic device. According to an embodiment of the present disclosure, the user may select full duplex communication based on selecting the switch item 600 or inputting a preset particular user gesture as described above.

In step 1111, the controller 180 controls displaying of a user interface. For example, the controller 180 may display a user interface related to configuration of an operation (role) of the electronic device for the second data and selection of data to be communicated in response to the user input. The user interface may include various graphical elements for identifying whether the electronic device will operate as the host or the slave.

In step 1113, the controller 180 configures the host or the slave for additional data communication between the electronic devices based on the user input. For example, the controller 180 may receive a user input for configuring the electronic device to operate as the host or the slave based on the user interface and configure the operation (role) of the electronic device according to the user input.

In step 1115, when the operation (role) of the electronic device is configured, the controller 180 performs data communication according to the configuration. For example, the controller 180 may activate a second communication path of a second standard (USB 2.0) which is not currently used with respect to second data (for example, a dynamic image file, picture file, music file, contacts and the like) selected based on the user interface and perform second data communication through the second communication path. According to an embodiment of the present disclosure, the second data communication may be performed through the second communication path of the second standard while the first data communication through which the first electronic device operating as the host transmits data to the second electronic device operating as the slave through the first communication path of the first standard is maintained. The controller 180 may change the relation between the host and the slave configured for the first data according to the operation (role) of the electronic device for the second data and transmit or receive the second data, or maintain the relation between the host and the slave configured for the first data and transmit or receive the second data.

Meanwhile, the operation of displaying the user interface in step 1111 and the operation of configuring the host or the slave in step 1113 may be omitted according to various embodiments of the present disclosure. According to an embodiment of the present disclosure, when the electronic device initiates full duplex communication, if the role (for example, host) of the electronic device corresponding to the first data communication, which is conventionally performed, and the role (for example, slave) of the electronic device corresponding to the second data communication, which is desired to be additionally performed are reversed, or when the first data communication and the second data communication are configured be supported only in different directions in the electronic device, steps 1111 and 1113 may be omitted and the full duplex communication may be automatically performed directly in step 1115.

Figure 12:
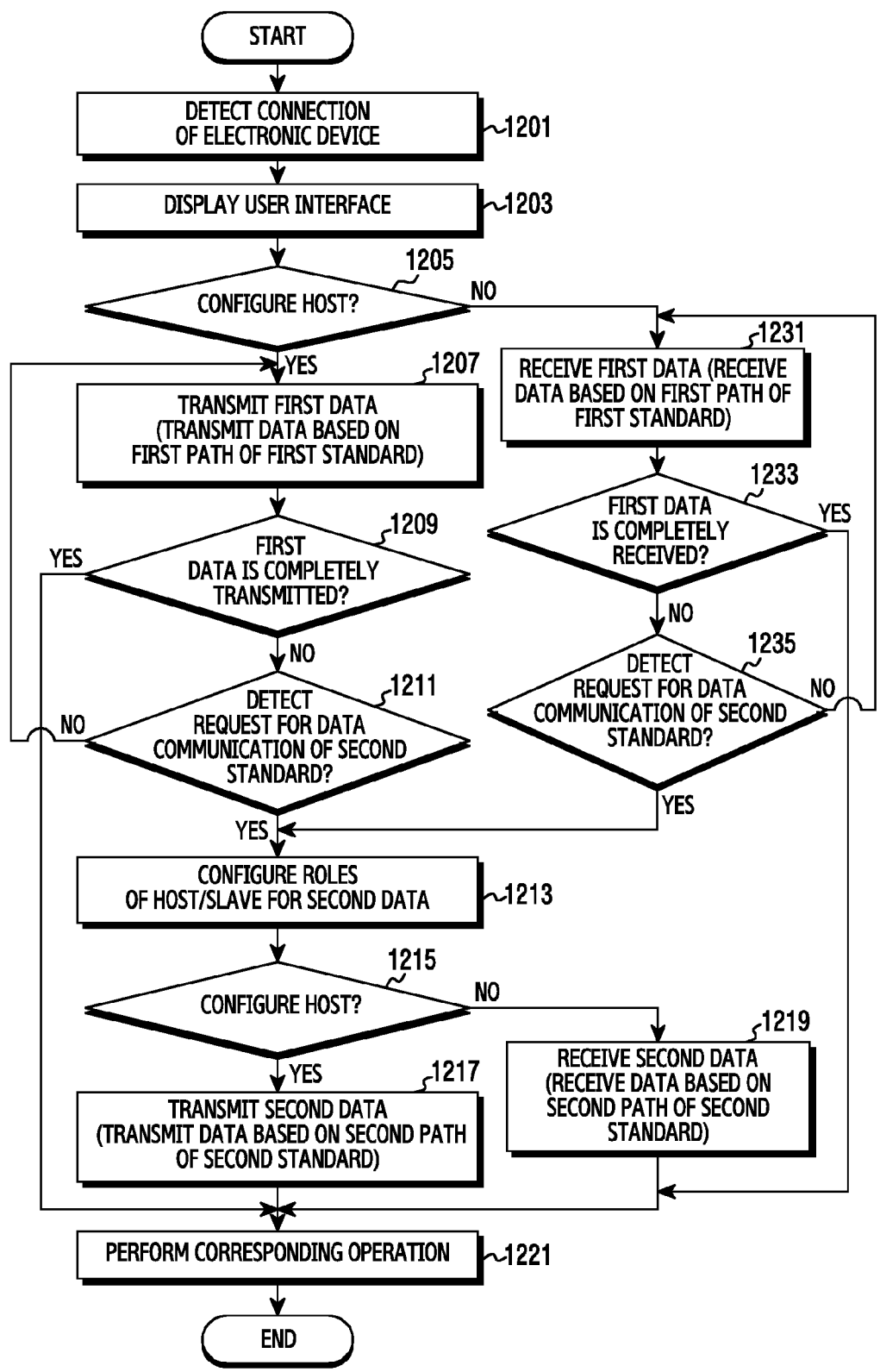
FIG. 12 is a flowchart illustrating a full duplex communication method of the electronic device according to an embodiment of the present disclosure.

FIG. 12 is a flowchart illustrating a full duplex communication method of the electronic device according to an embodiment of the present disclosure.

Referring to FIG. 12, in step 1201, the controller 180 detects a connection of another electronic device. For example, a connection between USB interfaces of the first electronic device and the second electronic device may be made through a USB cable.

In step 1203, the controller 180 controls displaying of a user interface. For example, the controller 180 may display a user interface related to configuration of an operation (role) of the electronic device and selection of data (for example, first data) to be communicated in response to the detection of the connection of the other electronic device.

In step 1205, the controller 180 determines the operation (role) configured based on the user interface. For example, the controller 180 may determine whether the electronic device is configured to operate as the host or the slave.

When it is determined that the electronic device operates as the host in step 1205 (Yes in step 1205), the controller 180 transmits the first data (for example, data selected by the electronic device operating as the host) selected by the user in step 1207. For example, the controller 180 may activate a first communication path of a first standard (for example, USB 3.0) having a priority for data communication with respect to the first data selected based on the user interface and perform first data communication through the first communication path.

In step 1209, the controller 180 determines whether the first data is completely transmitted. For example, the controller 180 may determine whether the first data is completely transmitted to the second electronic device operating as the slave while the first data transmission is performed.

When the first data is completely transmitted in step 1209 (Yes of step 1209), the controller 180 processes the corresponding operation in step 1221. For example, the controller 180 may display information on the completion of the transmission of the first data and process the operation (function) corresponding to a user input.

When the first data is not completely transmitted in step 1209 (No of step 1209), the controller 180 determines whether there is a request for data communication for a second standard in step 1211. For example, the controller 180 may detect whether there is a request for performing communication for another piece of data (for example, second data) while the first data transmission is performed. According to an embodiment of the present disclosure, the user may desire to transmit the second data to the first electronic device from the second electronic device (operating as the slave) that receives the first data. Alternatively, the user may desire to additionally transmit the second data to the second electronic device from the first electronic device (electronic device operating as the host) that transmits the first data. Accordingly, the user may generate a user input for performing full duplex communication by using the first electronic device or the second electronic device. The user may select the full duplex communication based on selecting the switch item 600 or inputting a preset particular user gesture.

When there is no detection of the request for data communication based on the second standard in step 1211 (No in step 1211), the controller 180 proceeds to step 1207 and controls performance of the operations after step 1207.

When the request for data communication based on the second standard is detected in step 1211 (Yes in step 1211), the controller 180 configures the operation (role) (operation of the host or the slave) of the electronic device for the second data in step 1213. For example, the controller 180 may display a user interface related to configuration of the operation (role) of the electronic device for the second data and selection of the second data to be communicated in response to the request for the data communication based on the second standard. The user interface may include various graphical elements for identifying whether the electronic device will operate as the host or the slave. The controller 180 may receive a user input for configuring the electronic device to operate as the host or the slave for the second data based on the user interface and configure the operation (role) of the electronic device according to the user input.

When operation (role) of the electronic device for the second data is configured in response to the user input, the controller 180 determines the configured operation (role) based on the user interface in step 1215. For example, the controller 180 may determine whether the electronic device is configured to operate as the host or the slave for the second data.

When it is determined that the electronic device is configured as the host in step 1215 (Yes in step 1215), the controller 180 transmits the second data (for example, data selected by the first electronic device operating as the host for the first data) selected by the user in step 1217. For example, the controller 180 may activate a second communication path of a second standard (USB 2.0) having a next priority which is not currently used for data communication with respect to the second data selected based on the user interface and perform second data transmission through the second communication path. According to an embodiment, the data communication for transmitting the second data through the second communication path of the second standard may be performed simultaneously while the data communication through which the first electronic device operating as the host transmits the first data to the second electronic device operating as the slave through the first communication path of the first standard is maintained.

In step 1221, the controller 180 processes performance of the corresponding operation. For example, the controller 180 determines whether the data communication is completed while simultaneously processing the data communication for the first data transmission and the second data transmission based on different communication paths. The controller 180 may determine whether, when one data communication is completed, a communication path of another data communication, which is currently performed, is changed, and process the corresponding operation.

When it is determined that the electronic device is configured as the slave in step 1215 (No in step 1215), the controller 180 receives the second data (for example, data selected by the second electronic device operating as the slave for the first data) selected by the user in step 1219. For example, the controller 180 may activate the second communication path of the second standard (for example, USB 2.0) having a next priority which is not currently used for data communication with respect to the second data selected based on the user interface and perform second data communication through the second communication path. The data communication for receiving the second data through the second communication path of the second standard may be performed simultaneously while the data communication through which the first electronic device operating as the host transmits the first data to the second electronic device operating as the slave through the first communication path of the first standard is maintained until the first data is completely transmitted.

In step 1221, the controller 180 may process performance of the corresponding operation. For example, the controller 180 may check whether the data communication is completed while simultaneously processing the data communication for the first data transmission and the second data reception based on different communication paths. The controller 180 may determine whether, when one data communication is completed, a communication path of another data communication, which is currently performed, is changed, and process the corresponding operation.

When it is determined that the electronic device operates as the slave in step 1205 (No in step 1205), the controller 180 receives the first data (for example, data selected by the second electronic device operating as the host) selected by the user in step 1231. For example, the controller 180 may activate the first communication path of the first standard (USB 3.0) having a priority for data communication with respect to the first data selected based on the user interface and perform first data reception through the first communication path.

In step 1233, the controller 180 may check whether the first data is completely received. For example, the controller 180 may determine whether the first data is completely transmitted by the second electronic device operating as the host while the first data reception is performed.

When the first data is completely received in step 1233 (Yes in step 1233), the controller 180 may process performance of the corresponding operation in step 1221. For example, the controller 180 may display information on the completion of the reception of the first data and process the operation (function) corresponding to a user input.

When the first data is not completely received in step 1233 (No in step 1233), the controller 180 may determine whether there is a request for data communication based on the second standard in step 1235. For example, the controller 180 may detect whether there is a request for performing communication for another piece of data (for example, second data) while the first data reception is performed. According to an embodiment, the user may desire to transmit the second data to the second electronic device from the first electronic device operating as the slave that receives the first data. Alternatively, the user may desire to additionally transmit the second data to the first electronic device from the second electronic device operating as the host that transmits the first data. Accordingly, the user may generate a user input for performing full duplex communication by using the first electronic device or the second electronic device. According to an embodiment of the present disclosure, the user may select the full duplex communication based on selecting the switch item 600 or inputting a preset particular user gesture.

When there is no detection of the request for data communication based on the second standard in step 1235 (No in step 1235), the controller 180 may proceed to step 1231 and control performance of the operations after step 1231.

When the request for data communication based on the second standard is detected in step 1235 (Yes in step 1235), the controller 180 may configure the operation (role) (operation of the host or the slave) of the electronic device for the second data in step 1213. For example, the controller 180 may display a user interface related to configuration of the operation (role) of the electronic device for the second data and selection of the second data to be communicated in response to the request for the data communication based on the second standard. The user interface may include various graphical elements for identifying whether the electronic device will operate as the host or the slave. The controller 180 may receive a user input for configuring the electronic device to operate as the host or the slave for the second data based on the user interface and configure the operation (role) of the electronic device according to the user input.

When operation (role) of the electronic device for the second data is configured in response to the user input, the controller 180 may determine the configured operation (role) based on the user interface in step 1215. For example, the controller 180 may determine whether the electronic device is configured to operate as the host or the slave for the second data.

When it is determined that the electronic device is configured as the host in step 1215 (Yes in step 1215), the controller 180 transmits the second data (for example, data selected by the first electronic device operating as the slave for the first data) selected by the user in step 1217. For example, the controller 180 may activate a second communication path of a second standard (USB 2.0) having a lower priority which is not currently used for data communication with respect to the second data selected based on the user interface and perform second data transmission through the second communication path. According to an embodiment of the present disclosure, the data communication for transmitting the second data through the second communication path of the second standard may be performed simultaneously while the data communication through which the first electronic device operating as the slave receives the first data from the second electronic device operating as the host through the first communication path of the first standard is continuously maintained until the first data is completely received.

In step 1221, the controller 180 processes performance of the corresponding operation. For example, the controller 180 determines whether the data communication is completed while simultaneously processing the data communication for the first data reception and the second data transmission based on different communication paths. The controller 180 may determine whether, when one data communication is completed, a communication path of another data communication, which is currently performed, is changed and process the corresponding operation.

When it is determined that the electronic device is configured as the slave in step 1215 (No in step 1215), the controller 180 receives the second data (for example, data selected by the second electronic device operating as the host for the first data) selected by the user in step 1219. For example, the controller 180 may activate the second communication path of the second standard (USB 2.0) having a lower priority which is not currently used for data communication with respect to the second data selected based on the user interface and perform second data communication through the second communication path. The data communication for receiving the second data through the second communication path of the second standard may be performed simultaneously while the data communication through which the first electronic device operating as the slave receives the first data from the second electronic device operating as the host through the first communication path of the first standard is continuously maintained until the first data is completely received.

In step 1221, the controller 180 processes performance of the corresponding operation. For example, the controller 180 determines whether the data communication is completed while simultaneously processing the data communication for the first data reception and the second data reception based on different communication paths. The controller 180 may determine whether, when one data communication is completed, a communication path of another data communication which is currently performed, is changed and process the corresponding operation.

Figure 13:
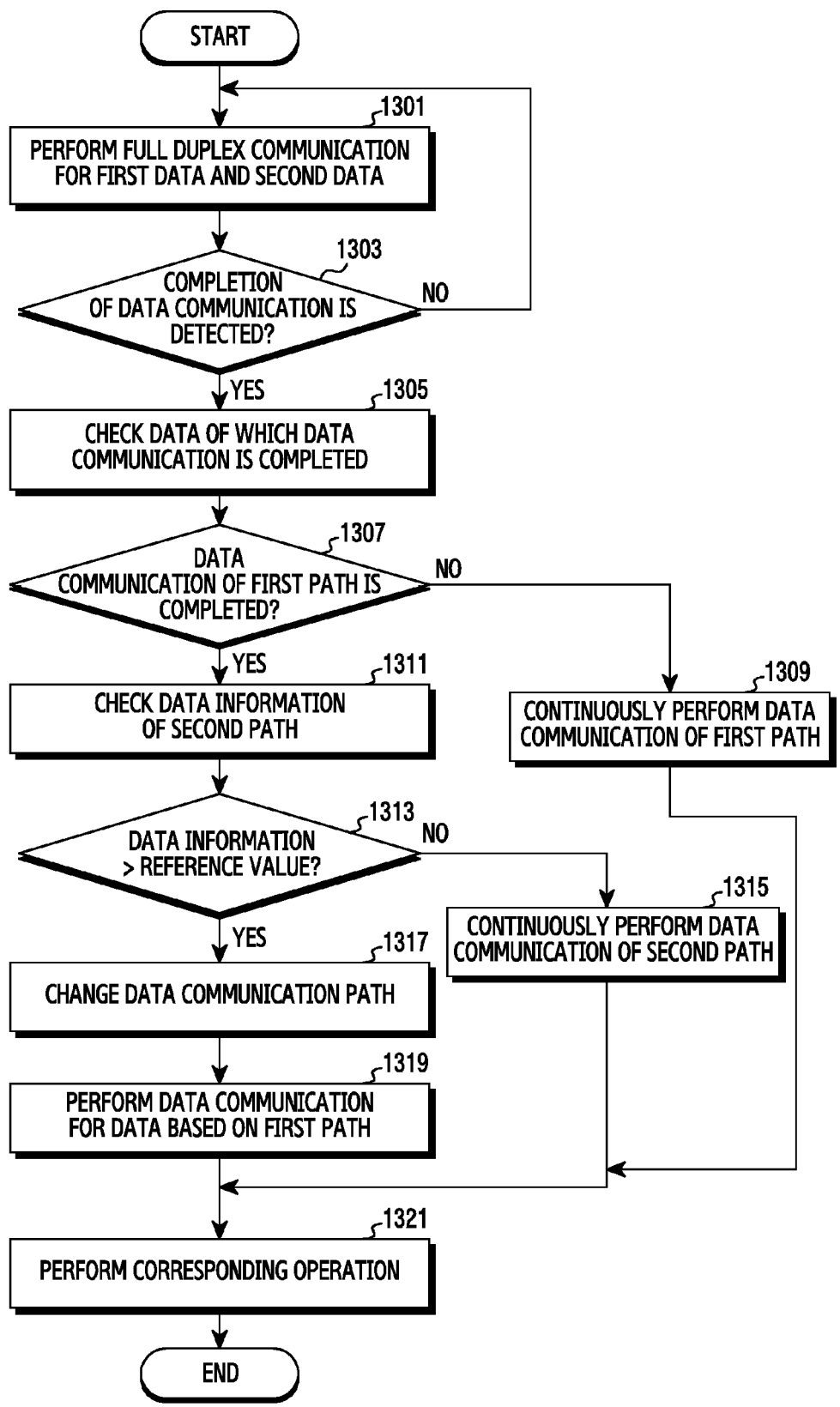
FIG. 13 is a flowchart illustrating an operation in which the electronic device changes a communication path for data communication according to an embodiment of the present disclosure.

FIG. 13 is a flowchart illustrating an operation in which the electronic device changes a communication path for data communication according to an embodiment of the present disclosure.

FIG. 13 is a flowchart illustrating an operation in which, when data communication based on one standard is completed while full duplex communication is performed between electronic devices based on different standards, the data communication is performed by adaptively changing a communication path of data communication based on the other standard.

Referring to FIG. 13, in step 1301, the controller 180 performs full duplex communication for first data and second data.

In step 1303, the controller 180 may determine whether data communication for at least one piece of data is completed while the full duplex communication is performed. For example, the controller 180 determines a process status of the data communication of the first data or the data communication of the second data and when at least one data communication (for example, transmission or reception) is completed, detect the completion of the data communication of the corresponding data.

When there is no detection of the completion of the data communication in step 1303 (No in step 1303), the controller 180 proceeds to step 1301 and controls performance of the operations after step 1301.

When the completion of the data communication is detected in step 1303 (Yes in step 1303), the controller 180 checks data for which the data communication is completed in step 1305 and determines which standard was used in completing data communication and the communication path corresponding to the standard in step 1307. For example, the controller 180 may determine whether the completed data communication corresponds to data communication based on the first communication path of the first standard or data communication based on the second communication path of the second standard.

When it is determined that the completed data communication corresponds to the data communication based on the second communication path of the second standard in step 1307 (No in step 1307), the controller 180 completes the data communication for the second communication path of the second standard (for example, deactivates the second communication path of the second standard) and continuously performs (maintains) the data communication for the first communication path of the first standard in step 1309. In step 1321, the controller 180 processes performance of the corresponding operation. For example, the controller 180 determines whether the data communication based on the first communication path of the first standard is completed and process the related operation according to the completion of the data communication.

When it is determined that the data communication based on the first communication path of the first standard is completed in step 1307 (Yes in step 1307), the controller 180 checks data information on the currently performed data communication in step 1311. For example, the controller 180 determines data information on the data corresponding to the data communication performed based on the second communication path of the second standard. The data information may be defined based on at least the data size (for example, the remaining capacity until data communication is completed) and an expected time required for data communication (for example, an expected time for completing data communication).

In step 1313, the controller 180 compares the data information and a preset reference value to determine whether the data information has a value larger than the reference value.

When it is determined that the data information is equal to or smaller than the reference value in step 1313 (No in step 1313), the controller 180 continuously performs (maintains) data communication for the second communication path of the second standard in step 1315. In step 1321, the controller 180 processes performance of the corresponding operation. For example, the controller 180 determines whether the data communication based on the second communication path of the second standard is completed and processes the related operation according to the completion of the data communication.

When it is determined that the data information is larger than the reference value in step 1313 (Yes in step 1313), the controller 180 changes the data communication path in step 1317. For example, the controller 180 may change the second communication path of the second standard, which is being used for the data communication, to the first communication path of the first standard having a priority which is not currently used. A data communication speed of the first standard may be faster than a data communication speed of the second standard. The electronic device may continuously process the data communication by changing the data communication based on the second communication path of the second standard, which supports a low speed, to the first communication path of the first standard, which supports a high speed in order to process the data communication faster.

In step 1319, the controller 180 processes the data communication for the data based on the changed first communication path of the first standard. According to an embodiment of the present disclosure, it is possible to activate the second communication path of the first standard and pause the data communication based on the second communication path of the second standard. The controller 180 may re-initiate the paused data communication through the activated first communication path of the first standard. Accordingly, the data communication can be continuously performed without disconnection of the data communication or loss of the data.

In step 1321, the controller 180 processes performance of the corresponding operation. For example, the controller 180 determines whether the data communication based on the changed communication path is completed and process the related operation according to the completion of the data communication.

The operation of checking the data information in step 1311 and the operation of determining the data information based on the reference value in step 1313 may be omitted according to various embodiments of the present disclosure. When the data communication based on the first standard having a higher priority is first completed during the full duplex communication, the controller 180 may automatically change the communication path such that the data communication based on the second standard having a lower priority is performed based on the first standard. For example, when the data communication having a faster communication speed is first completed regardless of data information on the data communication of the second standard, data communication having a slower communication speed may be automatically switched to the data communication having the faster communication speed and thus the data communication can be continuously performed.

Figure 14:
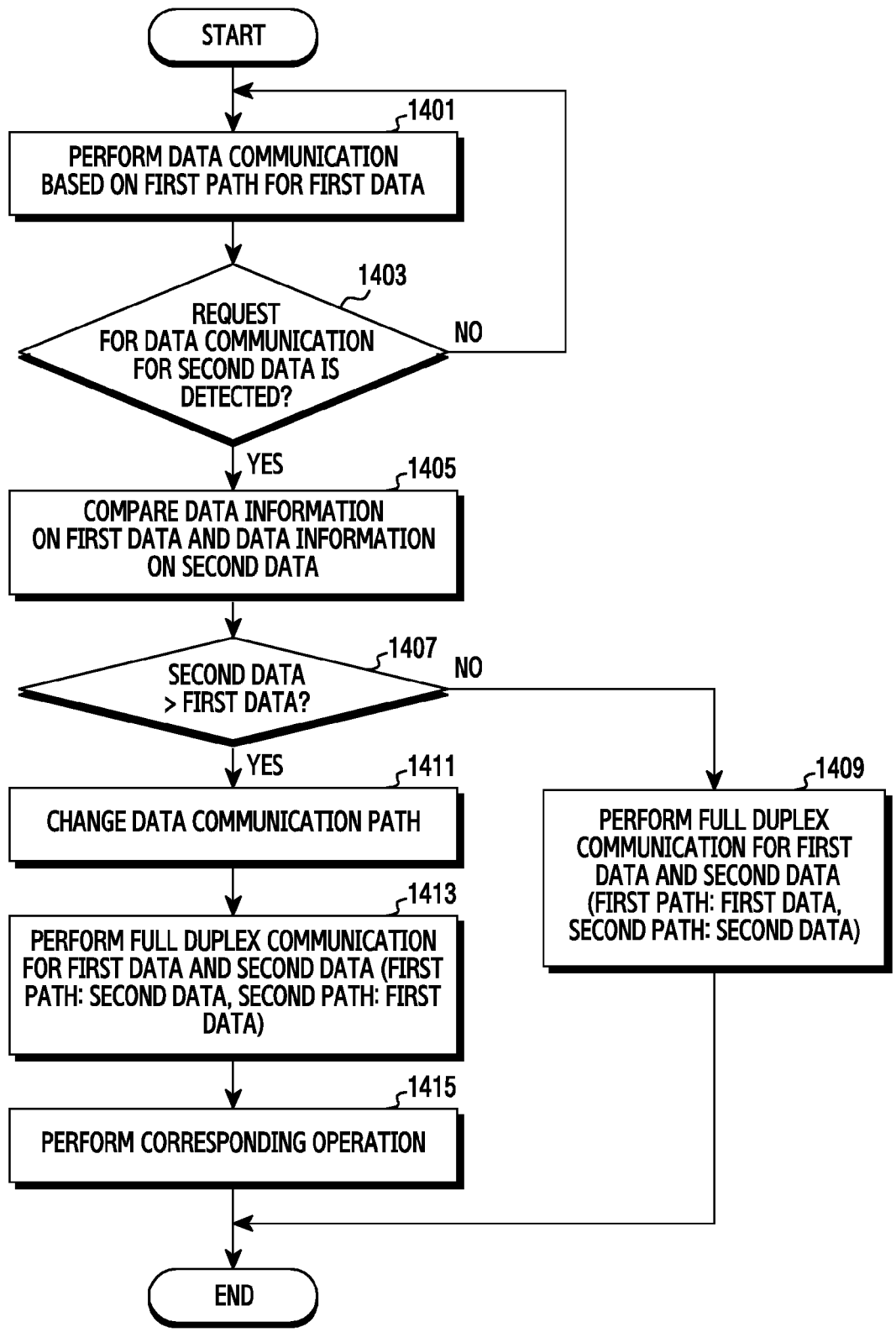
FIG. 14 is a flowchart illustrating an operation in which the electronic device changes a communication path for data communication according to an embodiment of the present disclosure.

FIG. 14 is a flowchart illustrating an operation in which the electronic device changes a communication path for data communication according to an embodiment of the present disclosure.

FIG. 14 illustrates an example of an operation of when data communication for second data is requested while data communication for first data is performed between electronic devices, performing data communication by adaptively changing a communication path of the data communication according to data information on the first data and the second data.

Referring to FIG. 14, the controller 180 performs data communication based on the first communication path of the first standard for the first data in step 1401.

In step 1403, the controller 180 determines if there is a request for data communication for the second data while the data communication is performed. For example, in response to a user input for performing full duplex communication while one data communication is performed, the controller 180 may activate a full duplex communication function and detect a request for data communication of the second data selected by the user.

When there is no detection of the request for data communication of the second standard in step 1403 (No in step 1403), the controller 180 proceeds to step 1401 and controls performance of the operations after step 1401.

When the request for data communication of the second data is detected in step 1403 (Yes of step 1403), the controller 180 compares data information on the first data and data information on the second data in step 1405. The data information may be defined based on at least the remaining data size (for example, the remaining capacity until data communication is completed) and an expected time required for data communication (for example, an expected time for completing data communication).

The controller 180 may determine whether the second data is larger than the first data based on a result of the comparison operation in step 1407. For example, the controller 180 may compare the size of the remainder of the first data and the size of the remainder of the second data. When the size of the remainder of the second data is larger, the controller 180 may determine that the second data is larger than the first data. Alternatively, the controller 180 may compare an expected time for communication completion of the first data and an expected time for communication completion of the second data. When the expected time for communication completion of the second data is longer than the expected time for communication completion of the first data, the controller 180 may determine that the second data is larger than the first data.

When it is determined that the second data is equal to or smaller than the first data in step 1407 (No in step 1407), the controller 180 processes performance of full duplex communication for the first data and the second data based on a result of the determination in step 1409. For example, the controller 180 may process data communication of the second data through the second communication path of the second standard while maintaining data communication of the first data based on the first communication path of the first standard.

When it is determined that the second data is larger than the first data in step 1407 (Yes in step 1407), the controller 180 changes the data communication path in step 1411. For example, the controller 180 may change the first communication path of the first standard for the first data, through which the data communication is currently performed, to the second communication path of the second standard. According to an embodiment of the present disclosure, a data communication speed of the first standard may be faster than a data communication speed of the second standard. Accordingly, in order to process data communication faster, the electronic device may compare target data when full duplex communication is initiated, allocate data having larger communication load (for example, data having a larger size or having a longer expected time for communication completion) among corresponding data to the first communication path of the first standard supporting a higher speed, and allocate data (for example, data having the small size or data having a shorter expected time for communication completion) having smaller communication load among the corresponding data to the second communication path of the second standard supporting a lower speed, so as to process the full duplex communication.

In step 1413, the controller 180 processes performance of the full duplex communication for first data and second data. For example, the controller 180 may process the data communication for the first data, which is performed based on the first communication path of the first standard, through the changed second communication path of the second standard and process the data communication for the second data through the first communication path of the first standard.

In step 1415, the controller 180 processes performance of the corresponding operation. For example, the controller 180 may perform full duplex communication corresponding to step 1409 or step 1413 and process data communication based on the changed communication path as described above with reference to FIG. 13 in accordance with the completion of at least one data communication.

An electronic device and an operation method thereof according to an embodiment of the present disclosure may support full duplex transmission between electronic devices connected through Universal Serial Bus (USB) interfaces. According to an embodiment of the present disclosure, it is possible to support full duplex transmission between electronic devices by using USB interfaces based on a USB type-C which can freely change the roles of the host and the slave between the electronic devices.

According to an embodiment of the present disclosure, the USB interface having at least two data communication paths can support forward and reverse data transmission (for example, data transmission by a change in the roles of the host and the slave only for second data) through a second communication path (for example, USB 2.0 based data communication path) according to a second standard for the second data while forward data transmission (for example, host→slave) is performed through a first communication path (for example, USB 3.0 based data communication path) according to a first standard for first data. Further, according to an embodiment of the present disclosure, it is possible to perform data transmission through the second communication path according to the second standard for the second data in parallel with data transmission through the first communication path according to the first standard for the first data.

According to an embodiment of the present disclosure, it is possible to reduce a data transmission time in data communication using the USB interface and reduce transmission time for the user as a result. Further, according to an embodiment of the present disclosure, it is not required to change the roles of the host and the slave whenever data is transmitted so that user convenience can be improved.

According to various embodiments of the present disclosure, an optimal environment for data transmission between electronic devices is presented and thus user convenience can be improved and usability, convenience, accessibility, and competitiveness of the electronic device can be improved.

The embodiments of the present disclosure disclosed herein and shown in the drawings are merely examples presented in order to describe technical details of the present disclosure and to help in understanding the present disclosure and are not intended to limit the scope of the present disclosure. Therefore, it should be understood that in addition to the embodiments disclosed herein, all modifications and changes or modified and changed forms derived from the technical idea of the present disclosure fall within the scope of the present disclosure. Therefore, the scope of the present disclosure should not be defined as being limited to the embodiments, but should be defined by the appended claims and their equivalents.

What is claimed is:
1. An electronic device, comprising:
an interface for supporting a connection with another electronic device;
a plurality of communication paths operating according to different standards; and
a controller configured to:
control first data communication for first data based on a first communication path according to a first standard between electronic devices connected through the interface,
control second data communication for second data based on a second communication path according to a second standard during the first data communication,
compare first data information on the first data and second data information on the second data, and
control full duplex communication for the first data and the second data based on a result of the comparison.
2. The electronic device of claim 1, wherein the interface includes a type C Universal Serial Bus interface, and wherein the first data communication according to the first standard is performed in a higher speed than the second data communication according to the second standard.

3. The electronic device of claim 1, wherein the controller is further configured to:
transmit the first data based on the first communication path when the electronic device is configured as a host during the first data communication of the first data, and
receiving the first data based on the first communication path when the electronic device is configured as a slave during the first data communication of the first data.

4. The electronic device of claim 1, wherein the controller is further configured to:
transmit the second data based on the second communication path when the electronic device is configured as a host during the full duplex communication, and
receive the second data based on the second communication path when the electronic device is configured as a slave during the full duplex communication.

5. The electronic device of claim 1, wherein the controller is further configured to:
maintain the first data communication based on the first communication path when an amount of the second data is less than or equal to an amount of the first data, and
control the second data communication based on the second communication path according to the second standard.

6. The electronic device of claim 1, wherein the controller is further configured to:
pause the first data communication when an amount of the second data is greater than an amount of the first data,
control the first data communication based on the second communication path, and
control the second data communication based on the first communication path.

7. The electronic device of claim 1, wherein the controller is further configured to:
determine the second data information on the second data, when the first data communication is completed during the full duplex communication, and
control the second data communication for the second data based on the first communication path when an amount of the second data is greater than a preset reference value.

8. The electronic device of claim 1, further comprising:
a display for displaying a user interface related to at least one of the connection, the first data communication, the second data communication, and the full duplex communication with the another electronic device.

9. The electronic device of claim 8, wherein the full duplex communication is executed based on a switch item in the user interface or a preset user gesture.

10. A method of performing data communication by an electronic device, the method comprising:
detecting a connection with another electronic device through an interface;
configuring the electronic device as a host or a slave for first data communication of first data;
performing the first data communication of the first data based on a first communication path according to a first standard;
configuring the electronic device as the host or the slave for second data communication of second data during the first data communication; and
performing the second data communication of the second data based on a second communication path according to a second standard,
wherein performing the second data communication comprises:
comparing first data information on the first data and second data information on the second data; and
performing full duplex communication for the first data and the second data based on a result of the comparison.

11. The method of claim 10, wherein the interface includes a type C Universal Serial Bus interface, and
wherein the first data communication according to the first standard is performed in a higher speed than the second data communication according to the second standard.

12. The method of claim 10, wherein performing the first data communication comprises:
transmitting the first data based on the first communication path when the electronic device is configured as the host; or
receiving the first data based on the first communication path when the electronic device is configured as the slave.

13. The method of claim 10, wherein performing the second data communication comprises:
transmitting the second data based on the second communication path when the electronic device is configured as the host; or
receiving the second data based on the second communication path when the electronic device is configured as the slave.

14. The method of claim 10, wherein performing the second data communication comprises:
maintaining the first data communication based on the first communication path, when an amount of the second data is less than or equal to an amount of the first data; and
performing the second data communication based on the second communication path according to the second standard.

15. The method of claim 14, wherein performing the second data communication comprises:
pausing the first data communication, when the amount of the second data is greater than the first data;
performing the first data communication based on the second communication path; and
performing the second data communication based on the first communication path.

16. The method of claim 10, further comprising:
determining the second data information on the second data when the first data communication of the first data is completed during the full duplex communication; and
performing the second data communication for the second data based on the first communication path when an amount of the second data is greater than a preset reference value.

17. A computer-readable recording medium having a program recorded therein to execute a process, the process comprising:
detecting a connection with another electronic device through an interface;
processing first data communication for first data based on a first communication path according to a first standard; and processing second data communication for second data based on a second communication path according to a second standard during the first data communication, wherein processing the second data communication comprises:
  comparing first data information on the first data and second data information on the second data; and
  performing full duplex communication for the first data and the second data based on a result of the comparison.

* * * * *